(12) United States Patent
Gadawski

(10) Patent No.: US 8,353,315 B2
(45) Date of Patent: Jan. 15, 2013

(54) END CAP

(75) Inventor: Thomas J. Gadawski, Shelby Township, MI (US)

(73) Assignee: LG Chem, Ltd., Seoul (KR)

( * ) Notice: Subject to any disclaimer, the term of this patent is extended or adjusted under 35 U.S.C. 154(b) by 6 days.

(21) Appl. No.: 12/861,381

(22) Filed: Aug. 23, 2010

(65) Prior Publication Data

US 2012/0042977 A1 Feb. 23, 2012

(51) Int. Cl.
*F16L 55/10* (2006.01)

(52) U.S. Cl. .......... 138/89; 138/89.3; 220/322; 220/378

(58) Field of Classification Search ............... 138/89, 138/89.3; 220/251, 322, 378
See application file for complete search history.

(56) References Cited

U.S. PATENT DOCUMENTS

| | | | | |
|---|---|---|---|---|
| 1,806,364 | A | * | 5/1931 | Newman ...................... 220/322 |
| 2,273,244 | A | | 2/1942 | Ambruster |
| 2,814,404 | A | * | 11/1957 | Towns ......................... 215/320 |
| 3,394,836 | A | * | 7/1968 | Millard ....................... 220/210 |
| 3,503,558 | A | | 3/1970 | Galiulo et al. |
| 3,522,100 | A | | 7/1970 | Lindstrom |
| 3,588,149 | A | * | 6/1971 | Demler ....................... 285/110 |
| 3,603,621 | A | | 9/1971 | Parsons |
| 4,009,720 | A | * | 3/1977 | Crandall .................. 128/207.15 |
| 4,390,841 | A | | 6/1983 | Martin et al. |
| 4,396,689 | A | | 8/1983 | Grimes et al. |
| 4,706,737 | A | | 11/1987 | Taylor et al. |
| 4,730,856 | A | | 3/1988 | Washizu |
| 5,071,020 | A | * | 12/1991 | Reutter .................. 220/203.06 |
| 5,071,652 | A | | 12/1991 | Jones et al. |
| 5,123,677 | A | | 6/1992 | Kreczko et al. |
| 5,228,724 | A | | 7/1993 | Godeau |
| 5,270,131 | A | | 12/1993 | Diethelm et al. |
| 5,330,235 | A | | 7/1994 | Wagner et al. |
| 5,346,786 | A | | 9/1994 | Hodgetts |
| 5,354,630 | A | | 10/1994 | Earl et al. |
| 5,364,711 | A | | 11/1994 | Yamada et al. |
| 5,385,793 | A | | 1/1995 | Tiedemann et al. |

(Continued)

FOREIGN PATENT DOCUMENTS

CN 1512518 A 7/2004

(Continued)

OTHER PUBLICATIONS

Chinese Office Action dated Dec. 7, 2007 for Chinese Patent Application No. 200480025941.5 (PCT/KR2004/002399).

(Continued)

*Primary Examiner* — James Hook
(74) *Attorney, Agent, or Firm* — Buckert Patent & Trademark Law Firm, P.C.; John F. Buckert

(57) ABSTRACT

An end cap for sealing an end of a tubular wall is provided. The end cap includes a circular-shaped body having an inner surface defining an aperture that extends into the circular-shaped body but not completely through the circular-shaped body. The end cap further includes a sealing member disposed on at least a portion of the inner surface of the circular-shaped body. The end cap further includes first and second finger portions extending in a first direction from the circular-shaped body that are configured to removably engage first and second notches in the tubular wall such that the inner surface contacts an outer surface of the tubular wall and the end cap is removably attached to the tubular wall.

9 Claims, 24 Drawing Sheets

U.S. PATENT DOCUMENTS

| | | | |
|---|---|---|---|
| 5,487,955 A | 1/1996 | Korall et al. | |
| 5,487,958 A | 1/1996 | Tura | |
| 5,510,203 A | 4/1996 | Hamada et al. | |
| 5,520,976 A | 5/1996 | Giannetti et al. | |
| 5,561,005 A | 10/1996 | Omaru et al. | |
| 5,589,290 A | 12/1996 | Klink et al. | |
| 5,606,242 A | 2/1997 | Hull et al. | |
| 5,652,502 A | 7/1997 | van Phuoc et al. | |
| 5,658,682 A | 8/1997 | Usuda et al. | |
| 5,663,007 A | 9/1997 | Ikoma et al. | |
| 5,693,432 A | 12/1997 | Matsumoto | |
| 5,756,227 A | 5/1998 | Suzuki et al. | |
| 5,796,239 A | 8/1998 | can Phuoc et al. | |
| 5,825,155 A | 10/1998 | Ito et al. | |
| 5,873,610 A * | 2/1999 | Szabo | 285/319 |
| 5,882,047 A | 3/1999 | Ostrander et al. | |
| 5,982,403 A | 11/1999 | Inagaki | |
| 6,016,047 A | 1/2000 | Notten et al. | |
| 6,099,986 A | 8/2000 | Gauthier et al. | |
| 6,117,584 A | 9/2000 | Hoffman et al. | |
| 6,121,752 A | 9/2000 | Kitahara et al. | |
| 6,182,694 B1 | 2/2001 | Sievers et al. | |
| 6,257,328 B1 | 7/2001 | Fujiwara et al. | |
| 6,257,417 B1 * | 7/2001 | Szumera | 210/443 |
| 6,279,600 B1 * | 8/2001 | Robinson | 137/232 |
| 6,295,980 B1 | 10/2001 | Lopez et al. | |
| 6,353,815 B1 | 3/2002 | Vilim et al. | |
| 6,362,598 B2 | 3/2002 | Laig-Horstebrock et al. | |
| 6,371,319 B2 * | 4/2002 | Yeaton et al. | 215/352 |
| 6,406,812 B1 | 6/2002 | Dreulle et al. | |
| 6,413,678 B1 | 7/2002 | Hamamoto et al. | |
| 6,422,027 B1 | 7/2002 | Coates, Jr. et al. | |
| 6,441,586 B1 | 8/2002 | Tate, Jr. et al. | |
| 6,448,741 B1 | 9/2002 | Inui et al. | |
| 6,462,949 B1 | 10/2002 | Parish, IV et al. | |
| 6,475,659 B1 | 11/2002 | Heimer | |
| 6,481,759 B1 | 11/2002 | Kawasaki et al. | |
| 6,501,036 B2 * | 12/2002 | Rochon et al. | 200/302.2 |
| 6,505,866 B1 | 1/2003 | Nakamura et al. | |
| 6,515,454 B2 | 2/2003 | Schoch | |
| 6,534,954 B1 | 3/2003 | Plett | |
| 6,539,920 B1 | 4/2003 | Spiers | |
| 6,563,318 B2 | 5/2003 | Kawakami et al. | |
| 6,666,263 B2 | 12/2003 | Luz et al. | |
| 6,688,654 B2 | 2/2004 | Romero | |
| 6,709,783 B2 | 3/2004 | Ogata et al. | |
| 6,724,172 B2 | 4/2004 | Koo | |
| 6,771,502 B2 | 8/2004 | Getz, Jr. et al. | |
| 6,780,538 B2 | 8/2004 | Hamada et al. | |
| 6,792,977 B2 * | 9/2004 | Presby | 138/89 |
| 6,821,671 B2 | 11/2004 | Hinton et al. | |
| 6,829,562 B2 | 12/2004 | Sarfert | |
| 6,832,171 B2 | 12/2004 | Barsoukov et al. | |
| 6,876,175 B2 | 4/2005 | Schoch | |
| 6,886,249 B2 | 5/2005 | Smalc | |
| 6,892,148 B2 | 5/2005 | Barsoukov et al. | |
| 6,926,174 B1 * | 8/2005 | Heldt | 222/321.7 |
| 6,927,554 B2 | 8/2005 | Tate, Jr. et al. | |
| 6,943,528 B2 | 9/2005 | Schoch | |
| 6,967,466 B2 | 11/2005 | Koch | |
| 6,982,131 B1 | 1/2006 | Hamada et al. | |
| 7,012,434 B2 | 3/2006 | Koch | |
| 7,026,073 B2 | 4/2006 | Ueda et al. | |
| 7,039,534 B1 | 5/2006 | Ryno et al. | |
| 7,061,246 B2 | 6/2006 | Dougherty et al. | |
| 7,072,871 B1 | 7/2006 | Tinnemeyer | |
| 7,098,665 B2 | 8/2006 | Laig-Hoerstebrock | |
| 7,109,685 B2 | 9/2006 | Tate, Jr. et al. | |
| 7,126,312 B2 | 10/2006 | Moore | |
| 7,147,045 B2 | 12/2006 | Quisenberry et al. | |
| 7,197,487 B2 | 3/2007 | Hansen et al. | |
| 7,199,557 B2 | 4/2007 | Anbuky et al. | |
| 7,229,327 B2 | 6/2007 | Zhao et al. | |
| 7,250,741 B2 | 7/2007 | Koo et al. | |
| 7,251,889 B2 | 8/2007 | Kroliczek et al. | |
| 7,253,587 B2 | 8/2007 | Meissner | |
| 7,264,902 B2 | 9/2007 | Horie et al. | |
| 7,315,789 B2 | 1/2008 | Plett | |
| 7,321,220 B2 | 1/2008 | Plett | |
| 7,327,147 B2 | 2/2008 | Koch | |
| 7,400,115 B2 | 7/2008 | Plett | |
| 7,446,504 B2 | 11/2008 | Plett | |
| 7,479,758 B2 | 1/2009 | Moon | |
| 7,518,339 B2 | 4/2009 | Schoch | |
| 7,521,895 B2 | 4/2009 | Plett | |
| 7,525,285 B2 | 4/2009 | Plett | |
| 7,583,059 B2 | 9/2009 | Cho | |
| 7,589,532 B2 | 9/2009 | Plett | |
| 7,846,573 B2 | 12/2010 | Kelly | |
| 7,857,359 B2 | 12/2010 | Zeitlinger et al. | |
| 7,878,553 B2 | 2/2011 | Wicks et al. | |
| 2001/0046624 A1 | 11/2001 | Goto et al. | |
| 2002/0074801 A1 | 6/2002 | Chan et al. | |
| 2003/0082440 A1 | 5/2003 | Mrotek et al. | |
| 2003/0184307 A1 | 10/2003 | Kozlowski et al. | |
| 2004/0021442 A1 | 2/2004 | Higashino | |
| 2004/0232696 A1 | 11/2004 | Andre | |
| 2005/0026014 A1 | 2/2005 | Fogaing et al. | |
| 2005/0100786 A1 | 5/2005 | Ryu et al. | |
| 2005/0127874 A1 | 6/2005 | Lim et al. | |
| 2005/0134038 A1 | 6/2005 | Walsh | |
| 2006/0100833 A1 | 5/2006 | Plett | |
| 2007/0037051 A1 | 2/2007 | Kim et al. | |
| 2007/0087266 A1 | 4/2007 | Bourke et al. | |
| 2007/0120533 A1 | 5/2007 | Plett | |
| 2007/0126396 A1 | 6/2007 | Yang | |
| 2008/0094035 A1 | 4/2008 | Plett | |
| 2008/0299446 A1 | 12/2008 | Kelly | |
| 2009/0029239 A1 | 1/2009 | Koetting et al. | |
| 2009/0159239 A1 | 6/2009 | Desai et al. | |
| 2009/0186265 A1 | 7/2009 | Koetting et al. | |
| 2009/0325051 A1 | 12/2009 | Niedzwiecki et al. | |
| 2009/0325052 A1 | 12/2009 | Koetting et al. | |
| 2009/0325053 A1 | 12/2009 | Koetting et al. | |
| 2009/0325054 A1 | 12/2009 | Payne et al. | |
| 2009/0325055 A1 | 12/2009 | Koetting et al. | |
| 2009/0325056 A1 | 12/2009 | Niedzwiecki et al. | |
| 2010/0086842 A1 | 4/2010 | Yang | |
| 2012/0042977 A1 | 2/2012 | Gadawski | |
| 2012/0043754 A1 | 2/2012 | Gadawski | |
| 2012/0045683 A1 | 2/2012 | Gadawski | |
| 2012/0045684 A1 | 2/2012 | Gadawski | |

FOREIGN PATENT DOCUMENTS

| | | |
|---|---|---|
| EP | 0736226 B1 | 3/1999 |
| EP | 0673553 B1 | 2/2001 |
| EP | 1435675 A1 | 7/2004 |
| JP | 4056079 A | 2/1992 |
| JP | 8138735 A | 5/1996 |
| JP | 8222280 A | 8/1996 |
| JP | 9129213 A | 5/1997 |
| JP | 09-219213 | 8/1997 |
| JP | 10199510 A | 7/1998 |
| JP | 11066949 A | 3/1999 |
| JP | 11191432 A | 7/1999 |
| JP | 2001167803 A | 6/2001 |
| JP | 2003219572 A | 7/2003 |
| JP | 2004006089 A | 1/2004 |
| JP | 2004288527 A | 10/2004 |
| JP | 2005-126315 | 5/2005 |
| JP | 2005518645 A | 6/2005 |
| JP | 2006032037 A | 2/2006 |
| JP | 2006210245 A | 8/2006 |
| JP | 2008-080995 | 4/2008 |
| KR | 100765659 B1 | 10/2007 |
| KR | 20080047641 A | 5/2008 |
| KR | 100889241 B1 | 3/2009 |
| KR | 100921346 B1 | 10/2009 |
| KR | 20100003139 A | 1/2010 |
| WO | WO03/071616 A2 | 8/2003 |

OTHER PUBLICATIONS

European Supplementary Search Report dated Aug. 28, 2009 for EP Application No. 04774658.

International Search Report for International Application No. PCT/KR2005/003755 dated Mar. 2, 2006.

International Search Report for PCT/KR2009/000258 dated Aug. 28, 2009.
International Search report for PCT/KR2009/003434 dated Jan. 18, 2010.
Machine translation of JP 08-138735, Aug. 2008.
Machine translation of JP 10-199510, Dec. 2008.
Machine translation of JP 2000 260469, Aug. 2009.
U.S. Appl. No. 12/426,795, filed Apr. 20, 2009 entitled Frame Member, Frame Assembly and Battery Cell Assembly Made Therefrom and Methods of Making the Same.
U.S. Appl. No. 12/433,155, filed Apr. 30, 2009 entitled Cooling System for a Battery System and a Method for Cooling the Battery System.
U.S. Appl. No. 12/433,397, filed Apr. 30, 2009 entitled Battery Systems, Battery Modules, and Method for Cooling a Battery Module.
U.S. Appl. No. 12/433,427, filed Apr. 30 ,2009 entitled Cooling Manifold and Method for Manufacturing the Cooling Manifold.
U.S. Appl. No. 12/433,485, filed Apr. 30, 2009 entitled Battery Systems, Battery Module, and Method for Cooling the Battery Module.
U.S. Appl. No. 12/433,534, filed Apr. 30, 2009 entitled Battery Systems, Battery Modules, and Method for Cooling a Battery Module.
U.S. Appl. No. 12/511,530, filed Jul. 29, 2009 entitled Battery Module and Method for Cooling the Battery Module.
U.S. Appl. No. 12/511,552, filed Jul. 29, 2009 entitled Battery Module and Method for Cooling the Battery Module.
U.S. Appl. No. 12/549,766, filed Aug. 28, 2009 entitled Battery Module and Method for Cooling the Battery Module.
U.S. Appl. No. 12/794,949, filed on Jun. 7, 2010 entitled Battery Module and Methods for Bonding a Cell Terminal of a Battery to an Interconnect Member.
U.S. Appl. No. 12/857,908, filed on Aug. 17, 2010 entitled Battery Cell Assemblies.
U.S. Appl. No. 12/861,364, filed on Aug. 23, 2010 entitled Connecting Assembly.
U.S. Appl. No. 12/861,375, filed on Aug. 23, 2010 entitled attery System and Manifold Assembly Having a Manifold Member and a Connecting Fitting.
U.S. Appl. No. 12/861,394, filed on Aug. 23, 2010 entitled Battery System and Manifold Assembly With Two Manifold Members Removably Coupled Together.
U.S. Appl. No. 12/868,111, filed on Aug. 25, 2010 entitled Battery Module and Methods for Bonding Cell Terminals of Battery Cells Together.
Machine translation of JP 08-138735.
Machine translation of JP 10-199510, Jul. 1998.
U.S. Appl. No. 12/426,795 filed Apr. 20, 2009 entitled Frame Member, Frame Assembly and Battery Cell Assembly Made Therefrom and Methods of Making the Same.
U.S. Appl. No. 12/433,155 filed Apr. 30, 2009 entitled Cooling System for a Battery System and a Method for Cooling the Battery System.
U.S. Appl. No. 12/433,397 filed Apr. 30, 2009 entitled Battery Systems, Battery Modules, and Method for Cooling a Battery Module.
U.S. Appl. No. 12/433,427 filed Apr. 30 ,2009 entitled Cooling Manifold and Method for Manufacturing the Cooling Manifold.
U.S. Appl. No. 12/433,485 filed Apr. 30, 2009 entitled Battery Systems, Battery Module, and Method for Cooling the Battery Module.
U.S. Appl. No. 12/433,534 filed Apr. 30, 2009 entitled Battery Systems, Battery Modules, and Method for Cooling a Battery Module.
U.S. Appl. No. 12/511,530 filed Jul. 29, 2009 entitled Battery Module and Method for Cooling the Battery Module.
U.S. Appl. No. 12/511,552 filed Jul. 29, 2009 entitled Battery Module and Method for Cooling the Battery Module.
U.S. Appl. No. 12/549,766 filed Aug. 28, 2009 entitled Battery Module and Method for Cooling the Battery Module.
U.S. Appl. No. 12/794,949 filed on Jun. 7, 2010 entitled Battery Module and Methods for Bonding a Cell Terminal of a Battery to an Interconnect Member.
U.S. Appl. No. 12/857,908 filed on Aug. 17, 2010 entitled Battery Cell Assemblies.
U.S. Appl. No. 12/861,364 filed on Aug. 23, 2010 entitled Connecting Assembly.
U.S. Appl. No. 12/861,375 filed on Aug. 23, 2010 entitled attery System and Manifold Assembly Having a Manifold Member and a Connecting Fitting.
U.S. Appl. No. 12/861,394 filed on Aug. 23, 2010 entitled Battery System and Manifold Assembly With Two Manifold Members Removably Coupled Together.
U.S. Appl. No. 12/868,111 filed on Aug. 25, 2010 entitled Battery Module and Methods for Bonding Cell Terminals of Battery Cells Together.
International Search Report for International Application No. PCT/KR2011/005821 dated Feb. 10, 2012.
International Search Report for International Application No. PCT/KR2011/005823 dated Mar. 22, 2012.
International Search Report for International Patent Application No. PCT/KR2011/005822 dated Mar. 22, 2012.
U.S. Appl. No. 13/587,102, filed Aug. 16, 2012 entitled Battery Module.

* cited by examiner

END CAP

TECHNICAL FIELD

This application relates generally to an end cap that can be easily coupled to a tubular wall.

BACKGROUND

Pipes have utilized threaded caps to seal ends of the pipes. However, the caps cannot be quickly attached to the pipes which results in increased assembly costs.

Accordingly, the inventor herein has recognized a need for an improved end cap that eliminates and/or reduces the above mentioned deficiency.

SUMMARY

An end cap for sealing an end of a tubular wall in accordance with an exemplary embodiment is provided. The end cap includes a circular-shaped body having an inner surface defining an aperture that extends into the circular-shaped body but not completely through the circular-shaped body. The end cap further includes a sealing member disposed on at least a portion of the inner surface of the circular-shaped body. The end cap further includes first and second finger portions extending in a first direction from the circular-shaped body that are configured to removably engage first and second notches in the tubular wall such that the inner surface contacts an outer surface of the tubular wall and the end cap is removably attached to the tubular wall.

DETAILED DESCRIPTION OF EXEMPLARY EMBODIMENTS

Figure 1:
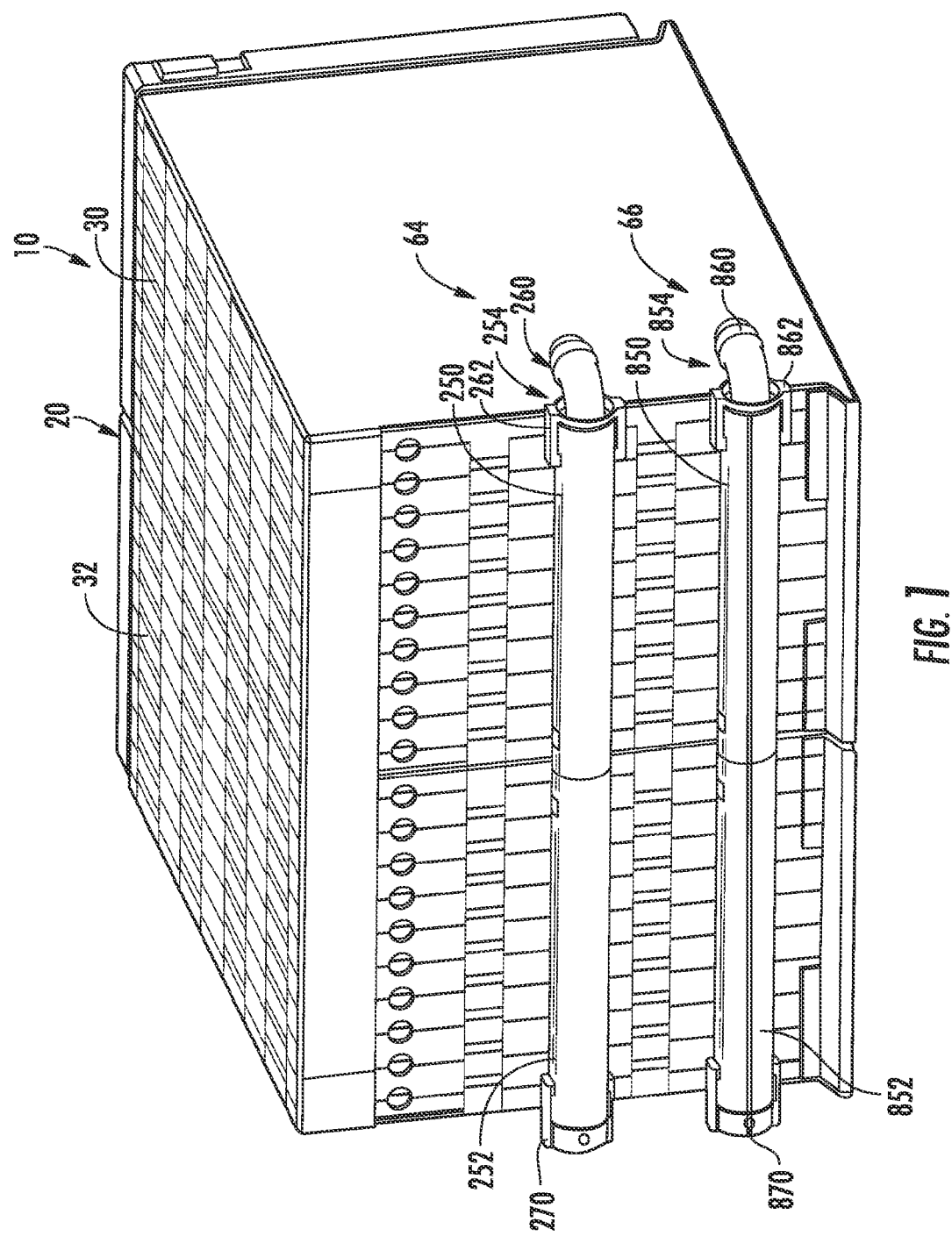
FIG. 1 is a schematic of a portion of a battery system having a battery pack and a cooling system in accordance with an exemplary embodiment.

Referring to FIGS. 1-4, a battery system 10 in accordance with an exemplary embodiment is illustrated. The battery system 10 includes a battery pack 20 and a cooling system 22 for cooling the battery pack 20. The battery pack 20 includes battery modules 30, 32 having a plurality of heat exchangers therein for cooling battery cells in the battery modules 30, 32. A battery module is defined as at least two battery cells physically or electrically coupled together.

The cooling system 22 includes a reservoir 60, a pump 62, a manifold assembly 64, a manifold assembly 66, and conduits 68, 70, 72. The reservoir 60 holds a fluid therein. The pump 62 pumps the fluid from the reservoir 60 via the conduit 68. Thereafter, the pump 62 pumps the fluid through the conduit 70 into the manifold assembly 64. The fluid flows through the manifold assembly 64 into both a plurality heat exchangers in the battery module 30 and another plurality heat exchangers in the battery module 32. The manifold assembly 66 receives the heated fluid from the heat exchangers in the battery modules 30, 32 and routes the heated fluid through the conduit 72 back to the reservoir 60.

Figure 5:
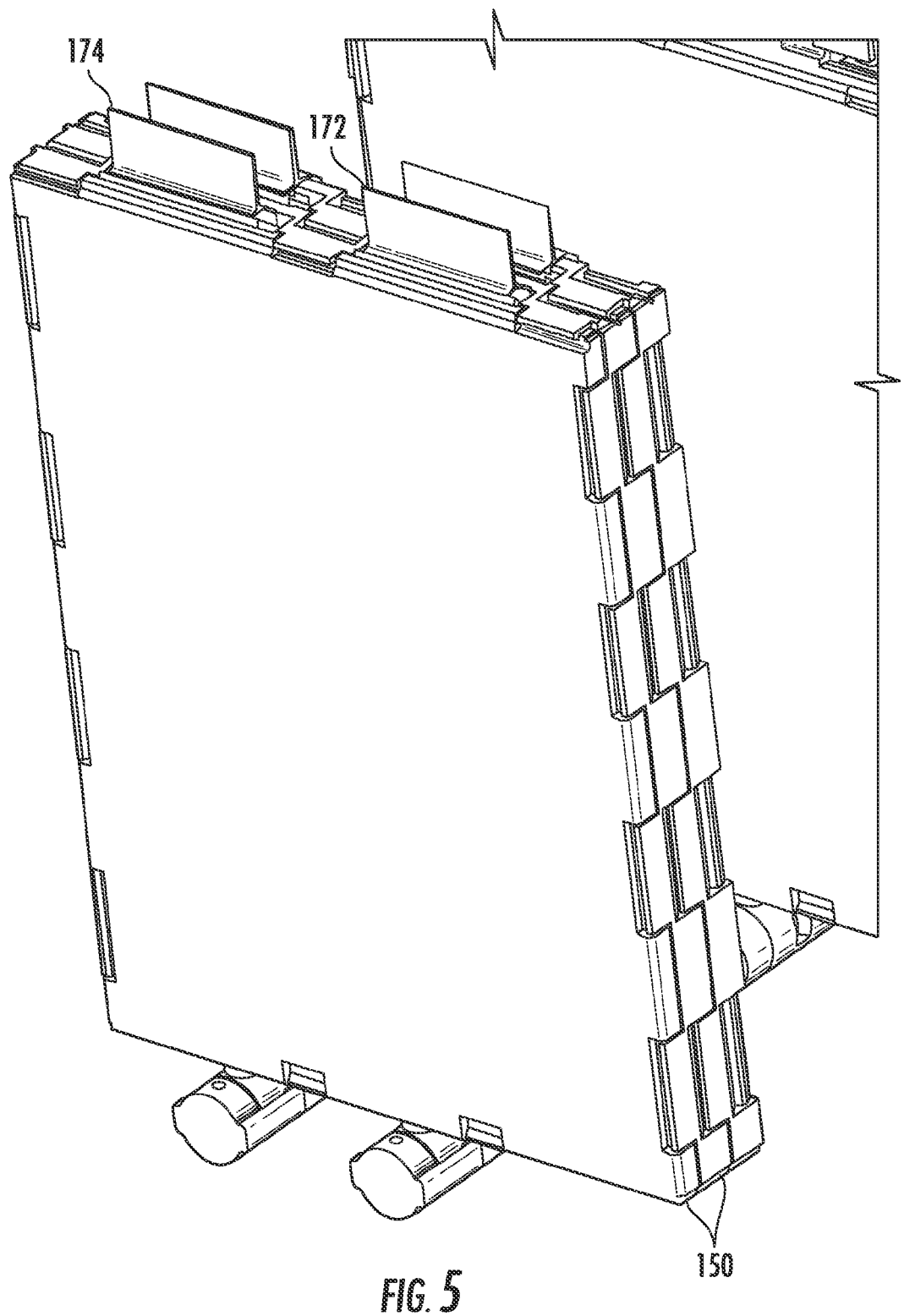
FIG. 5 is another enlarged view of a portion of the battery system of FIG. 1 illustrating battery cells therein.
Figure 6:
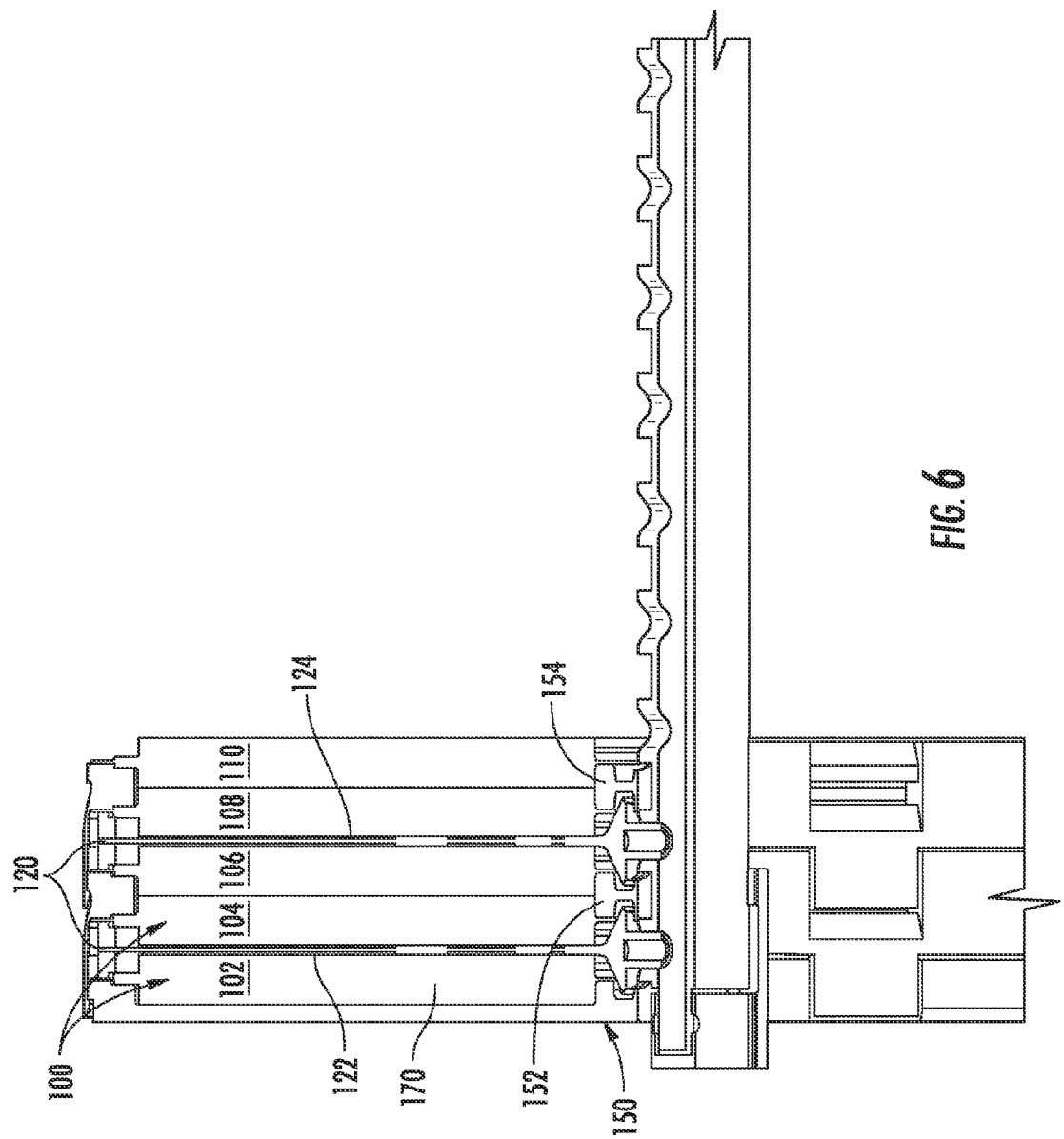
FIG. 6 is a cross-sectional view of a portion of the battery system of FIG. 1 illustrating battery cells therein.

Referring to FIGS. 5 and 6, the battery module 32 is configured to output an operational voltage that can be utilized to energize a motor of an electric vehicle or a hybrid vehicle. The battery module 32 includes a plurality of battery cells 100 including battery cells 102, 104, 106, 108, 110, a plurality of heat exchangers 120 including heat exchangers 122, 124, and a plurality of frame members 150 including frame members 150, 152, 154.

As shown, the heat exchanger 122 is disposed between the battery cells 102, 104 to extract heat energy from the battery cells 102, 104. Further, the heat exchanger 122 is disposed between the battery cells 106, 108 to extract heat energy from the battery cells 106, 108. The frame members 150, 152 are configured to be removably coupled together and to hold the battery cell 102, the heat exchanger 122, and the battery cell 104 therebetween. The frame members of 152, 154 are configured to be removably coupled together and to hold the battery cell 106, the heat exchanger 124, and the battery cell 108 therebetween.

In one exemplary embodiment, the plurality of battery cells 100 are rectangular-shaped pouch-type lithium-ion battery cells. Of course, other types of battery cells known to those skilled in the art could be utilized. Since each of the plurality of battery cells 100 have a substantially similar structure, only the battery cell 102 will be described in greater detail for purposes of simplicity. As shown, the battery cell 102 has a rectangular-shaped pouch-type body 170 and electrodes 172, 174 extending from the body 170. The battery cell 102 generates a voltage between the electrodes 172, 174.

Figure 4:
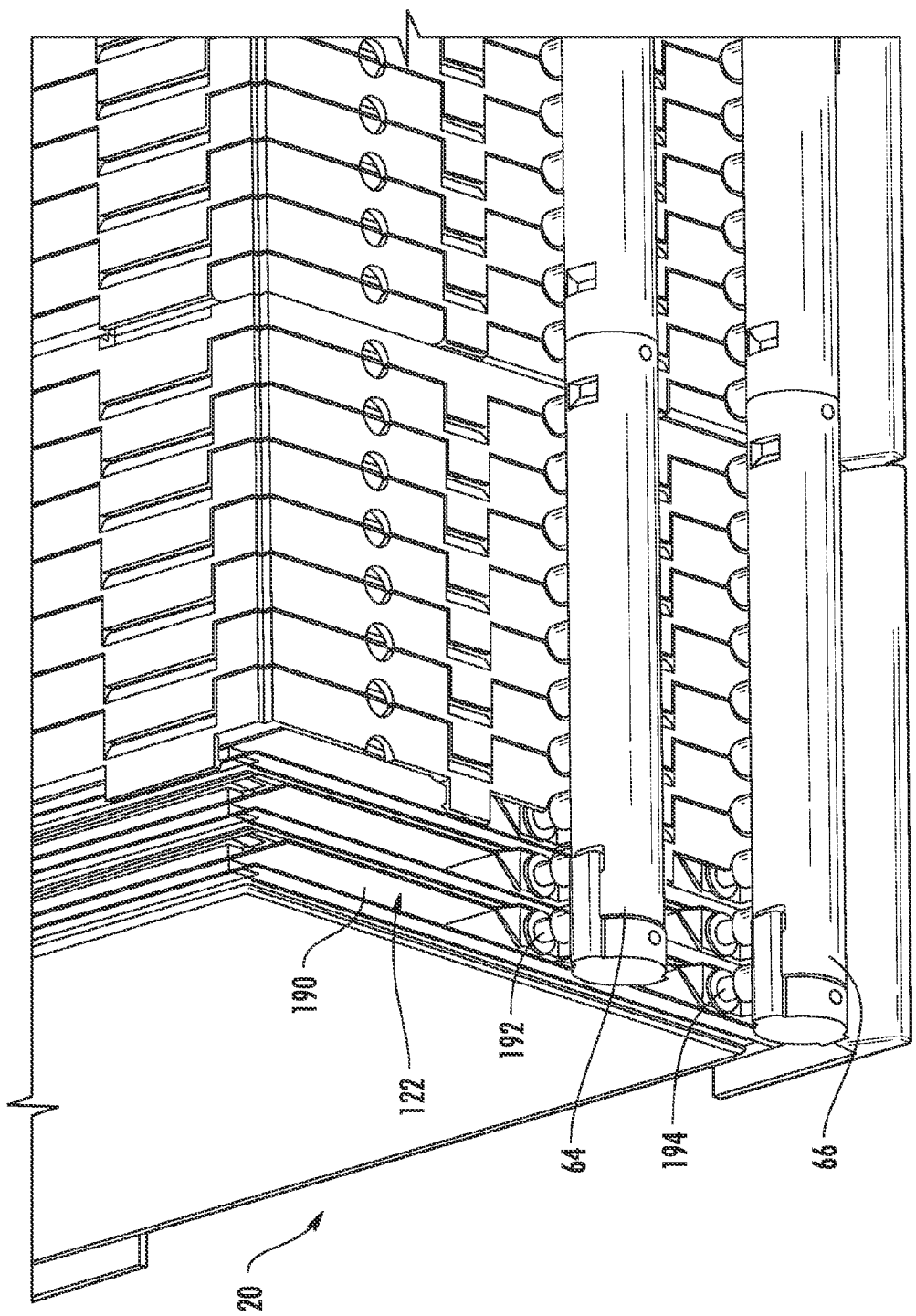
FIG. 4 is another enlarged view of a portion of the battery system of FIG. 1 illustrating battery cells and heat exchangers therein.

Referring to FIGS. 4 and 6, the plurality of heat exchangers 120 have an identical structure to one another. Accordingly, only the structure of the heat exchanger 122 will be described in greater detail below for purposes of simplicity. The heat exchanger 122 includes a rectangular-shaped body 190 defining an internal flow path, an inlet port 192 for receiving fluid into the body 190 from the manifold assembly 64, and an outlet port 194 for routing fluid from the body 190 into the manifold assembly 66. In one exemplary embodiment, heat exchangers 120 are constructed of aluminum. In another exemplary embodiment, the heat changers 120 are constructed of stainless steel. Of course, other materials known to those skilled in the art could be utilized to construct the heat exchangers 120.

Referring to FIG. 1, the manifold assembly 64 is configured to route cooling fluid into the heat exchangers of the battery modules 30, 32. The manifold assembly 64 includes manifold members 250, 252, a connecting assembly 254 having a connecting fitting 260 and a retaining member 262, and an end cap 270.

Referring to FIGS. 1 and 7-10, the manifold member 250 is configured to route fluid into the heat exchangers of the battery module 30. The manifold member 250 includes a tubular wall 290, tubular port members 330, 332, 334, 336, 338, 340, 342, 344, 346, 348, a sealing member 360, and a male connecting portion 370.

The tubular wall 290 has a first end 292 and a second end 294. In one exemplary embodiment, the tubular wall 290 is constructed of a plastic, such as polyethylene or polypropylene for example. The tubular wall 290 includes an inner surface 297 defining a central aperture 296 extending a longitudinal length of the tubular wall 290 from the first end 292 to the second end 294. The tubular wall 290 also has a plurality of apertures 300, 302, 304, 306, 308, 310, 312, 314, 316, 318 extending therethrough. Further, the tubular wall 290 has notches 320, 321, 322, 324 the extending therein.

The tubular port members 330-348 are disposed on the tubular wall 290 over the apertures 300-318, respectively. In one exemplary embodiment, the tubular port members 330-348 are constructed of an elastomer, such as at least one styrene, ethylene, butylene, propylene, and diene for example. Of course, other types of elastomers known to those skilled in the art could be utilized to construct the tubular port members 330-348. The tubular port members 330-348 are further removably coupled to inlet ports on the heat exchangers in the battery module 30. An advantage of utilizing the tubular port members 330-348 constructed of an elastomer is that the tubular port members 330-348 can be easily removably coupled to the inlet ports of the heat exchangers and forms a fluid-tight seal with the inlet ports.

Figure 8:
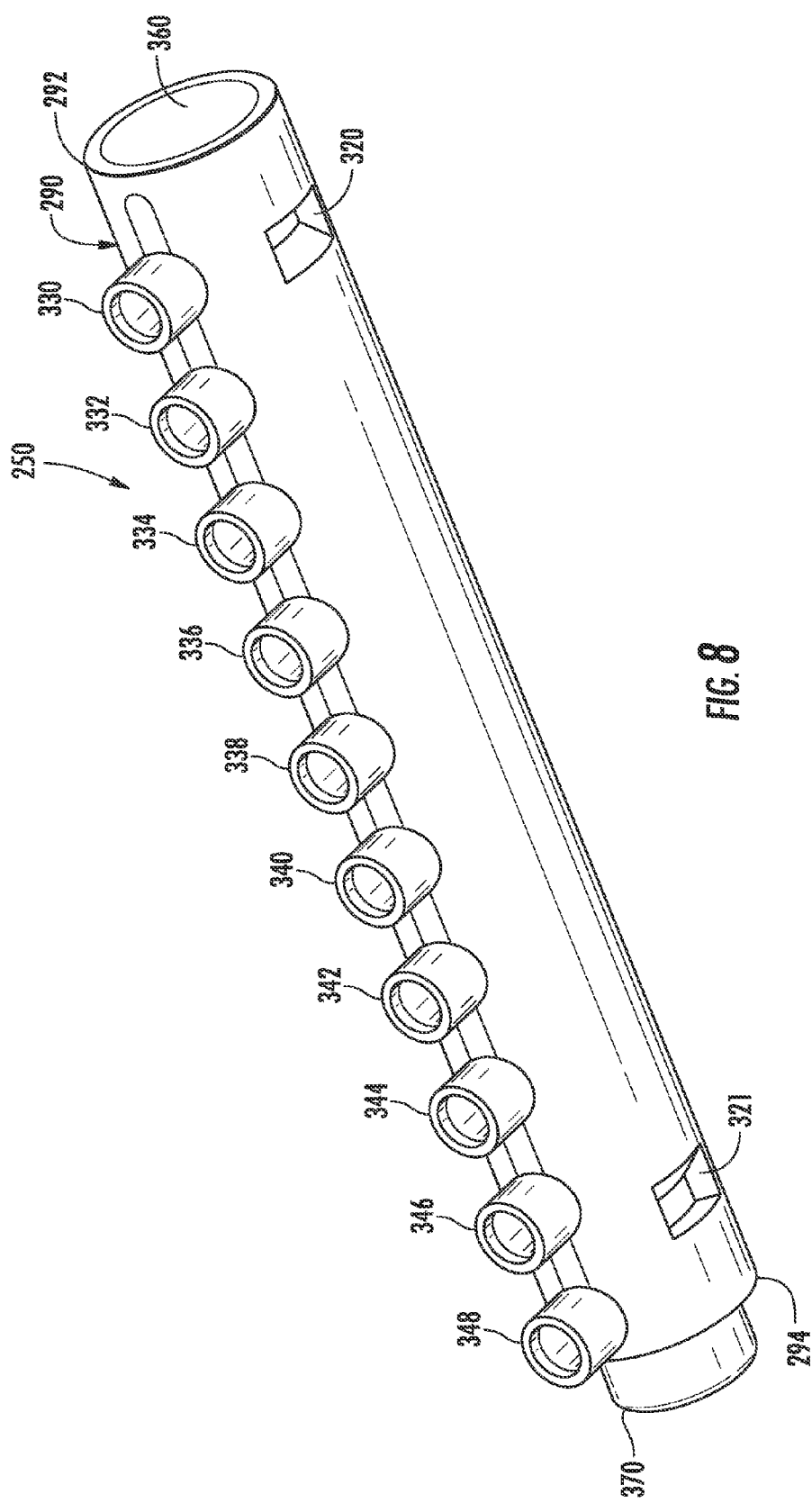
FIG. 8 is a schematic of the first manifold member of FIG. 7.
Figure 9:
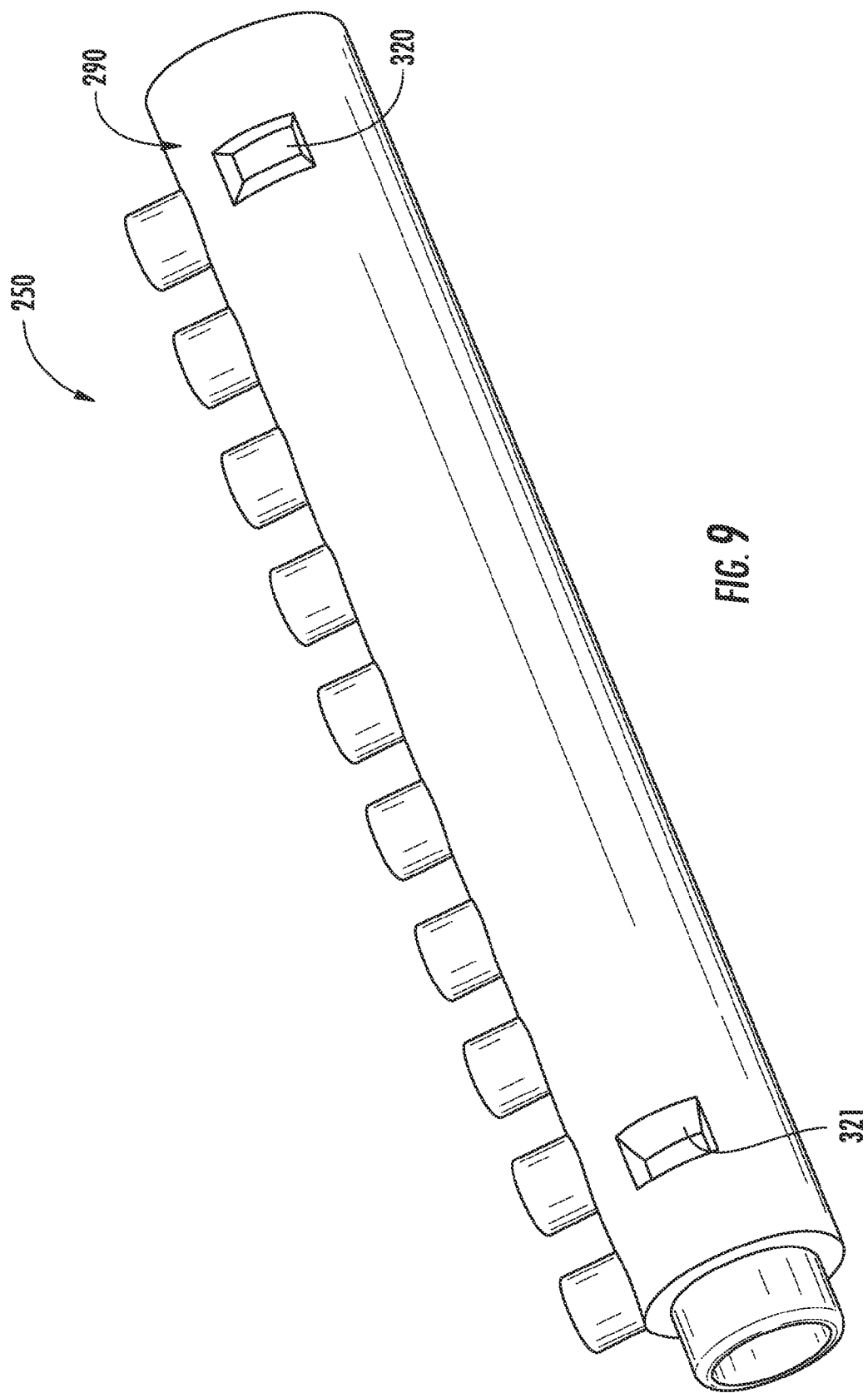
FIG. 9 is another schematic of the first manifold member of FIG. 8.
Figure 10:
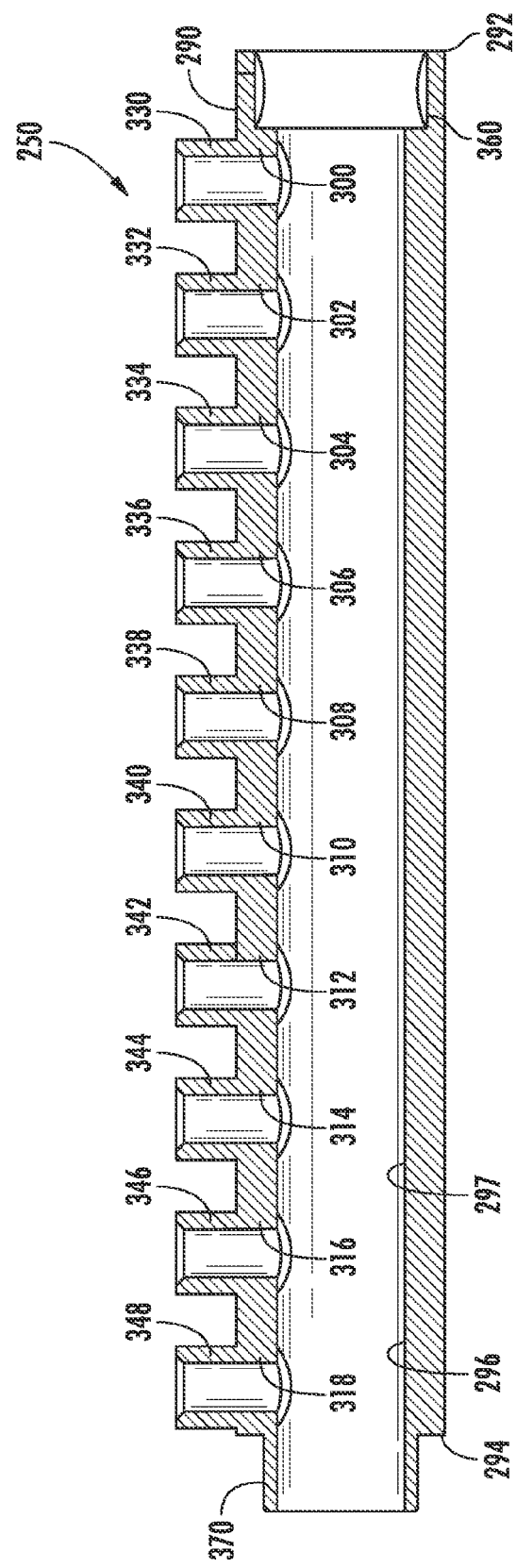
FIG. 10 is a cross-sectional view of the first manifold member of FIG. 8.

Referring to FIGS. 1, 8 and 10, the sealing member 360 is disposed on a portion of the inner surface 297 proximate to the first end 292. In one exemplary embodiment, the sealing member 360 is constructed of an elastomer, such as at least one styrene, ethylene, butylene, propylene, and diene for example. Of course, other types of elastomers known to those skilled in the art could be utilized to construct the sealing member 360. An advantage of utilizing the sealing member 360 constructed of an elastomer is that the sealing member 360 can be easily removably coupled to the connecting fitting 260 of the connecting assembly 254 and forms a fluid-tight seal with the connecting fitting 260.

The male connecting portion 370 extends from the second end 294 and is configured to engage the manifold member 252 in order to couple the manifold member 250 to the manifold member 252. The male connecting portion 370 is constructed of a plastic such as polyethylene or polypropylene for example.

Figure 7:
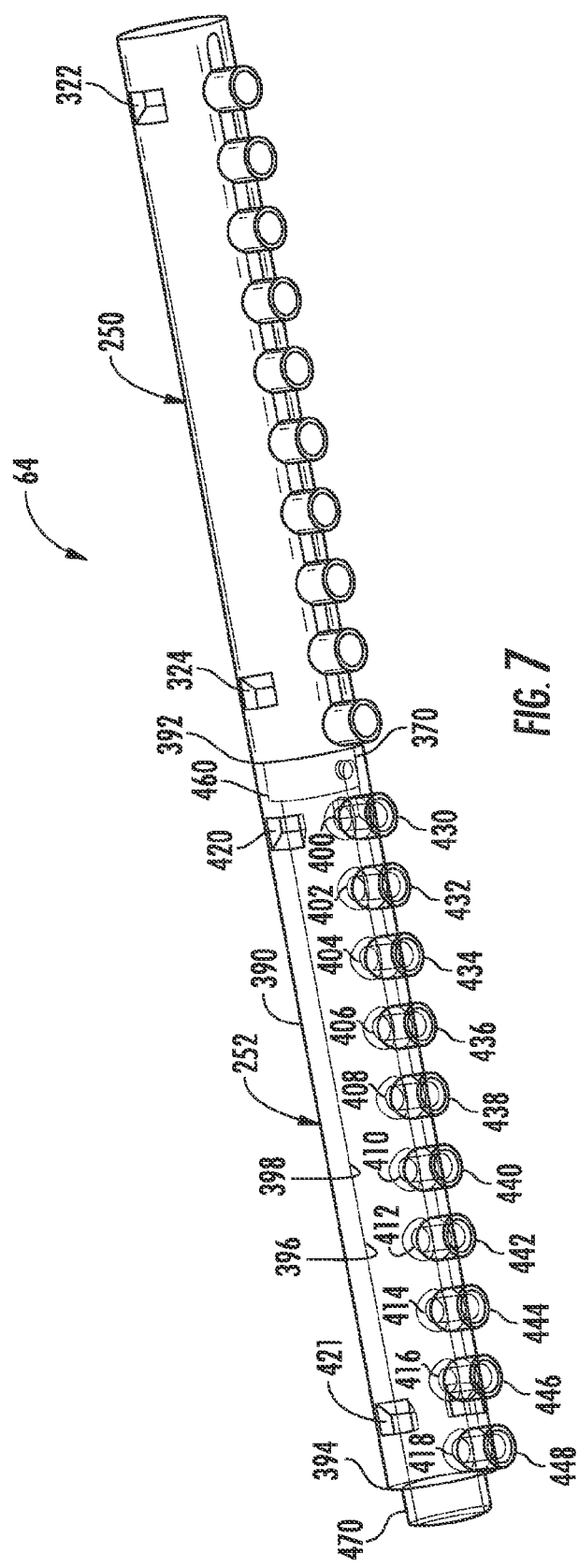
FIG. 7 is a schematic of first and second manifold members utilized in the cooling system of FIG. 1.

Referring to FIGS. 1 and 7, the manifold member 252 is coupled to the manifold member 250 and fluidly communicates with the manifold member 250. The manifold member 252 is configured to route fluid into the heat exchangers of the battery module 32. The manifold member 252 advantageously has an identical structure as the manifold member 250 that decreases component costs. The manifold member 252 includes a tubular wall 390, tubular port members 430, 432, 434, 436, 438, 440, 442, 444, 446, 448, a sealing member 460, and a male connecting portion 470.

Figure 20:
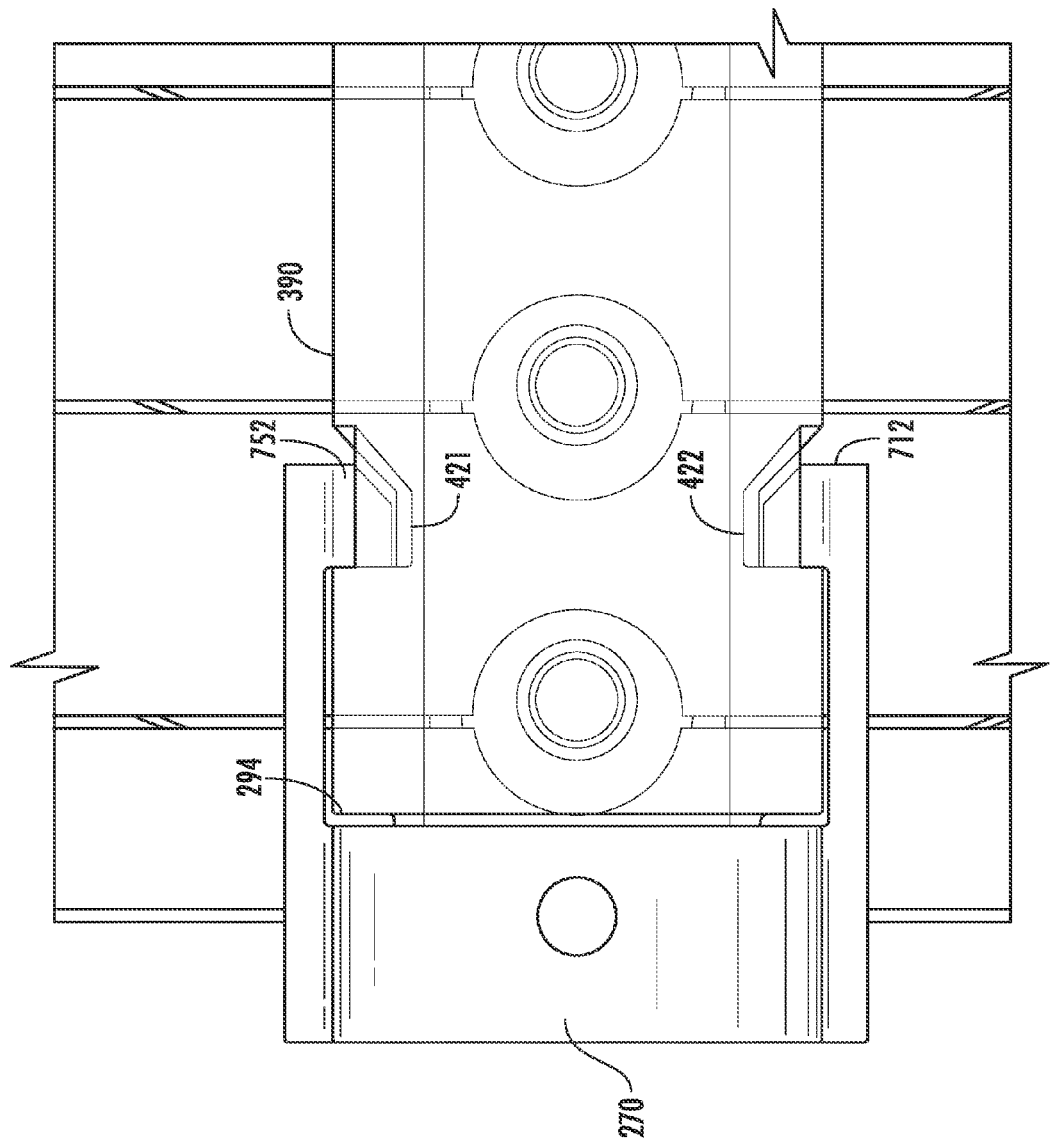
FIG. 20 is an enlarged schematic of an end cap utilized in the battery system of FIG. 1 in accordance with another exemplary embodiment.
Figure 21:
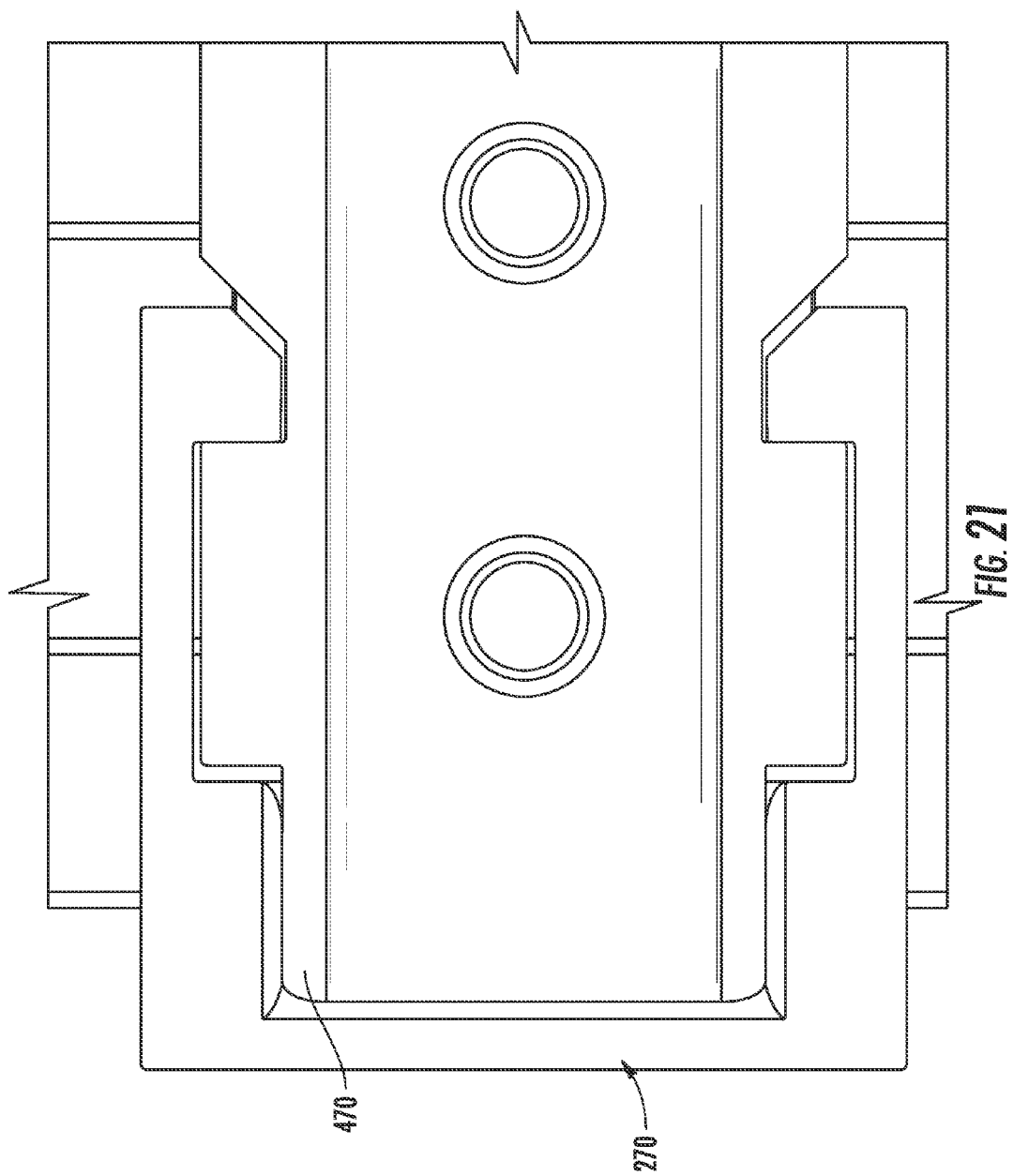
FIG. 21 is a cross-sectional view of the end cap of FIG. 20.
Figure 22:
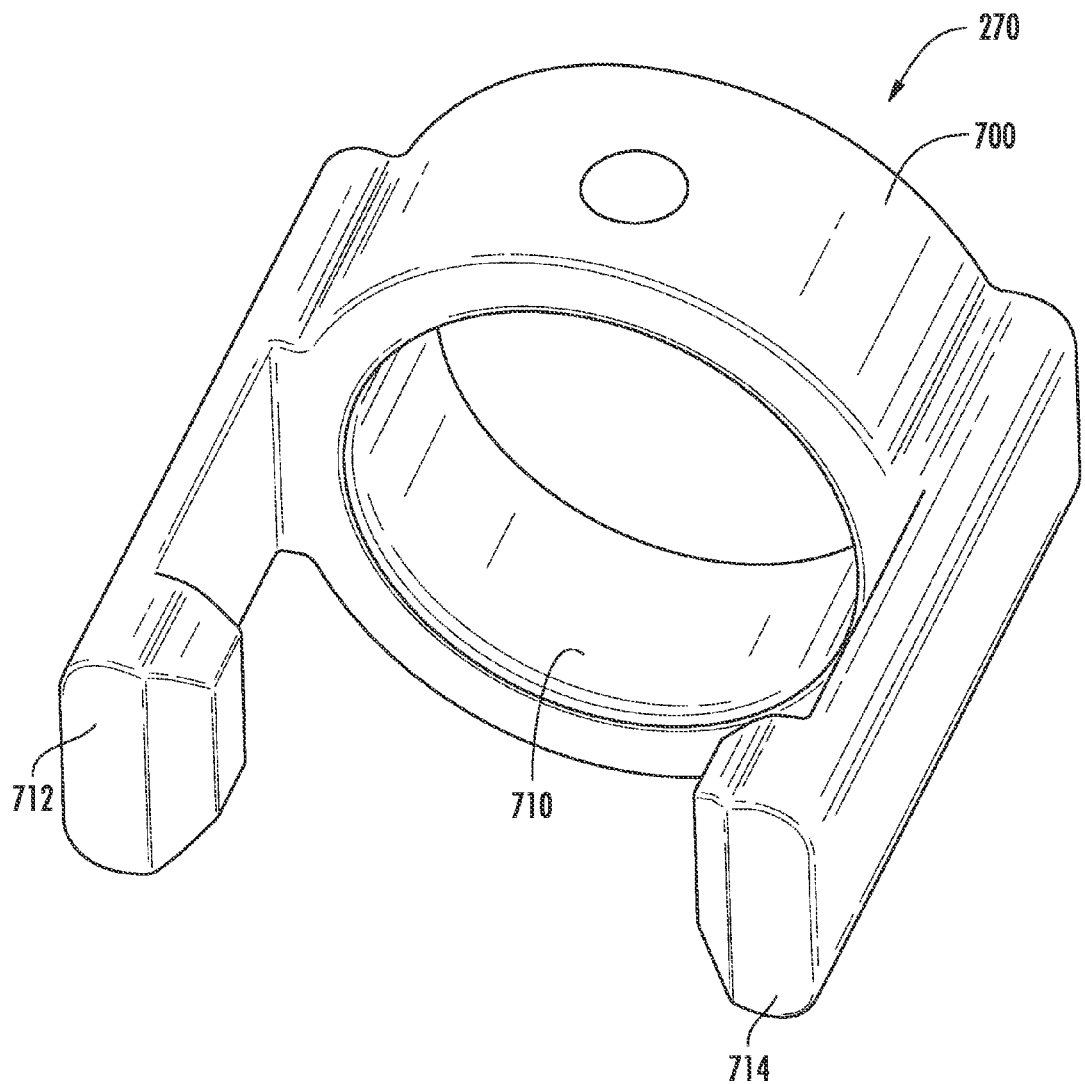
FIG. 22 is another view of the end cap of FIG. 20.

The tubular wall 390 has a first end 392 and a second end 394. In one exemplary embodiment, the tubular wall 390 is constructed of a plastic such as polyethylene or polypropylene for example. The tubular wall 390 includes an inner surface 398 defining a central aperture 396 extending a longitudinal length of the tubular wall 390 from the first end 392 to the second end 394. The tubular wall 390 also has a plurality of apertures 400, 402, 404, 406, 408, 410, 412, 414, 416, 418 extending therethrough. Further, the tubular wall 390 has notches 420, 421, 422 (see FIG. 20), and one other notch that is not shown, extending therein.

The tubular port members 430-448 are disposed on the tubular wall 390 over the apertures 400-418, respectively. In one exemplary embodiment, the tubular port members 430-448 are constructed of an elastomer such as at least one styrene, ethylene, butylene, propylene, and diene for example. Of course, other types of elastomers known to those skilled in the art could be utilized to construct the tubular port members 430-448. The tubular port members 430-448 are further removably coupled with inlet ports on the heat exchangers in the battery module 32. An advantage of utilizing the tubular port members 430-448 constructed of an elastomer is that the tubular port members 430-448 can be easily removably coupled to the inlet ports of the heat exchangers and form a fluid-tight seal with the inlet ports.

The sealing member 460 is disposed on a portion of the inner surface 397 proximate to the first end 392. In one exemplary embodiment, the sealing member 460 is constructed of an elastomer such as at least one styrene, ethylene, butylene, propylene, and diene for example. Of course, other types of elastomers known to those skilled in the art could be utilized to construct the sealing member 460. An advantage of utilizing the sealing member 460 constructed of an elastomer is that the sealing member 460 can be easily removably coupled against the male connecting portion 370 of the manifold member 250 to form a fluid-tight seal with the male connecting portion 370.

The male connecting portion 470 extends from the second end 394 and is configured to engage the end cap 270 in order to couple the manifold member 252 to the end cap 270. The male connecting portion 470 is constructed of a plastic, such as polyethylene or polypropylene for example.

Referring to FIG. 7, when coupling the manifold members 250, 252 together, the male connecting portion 370 of the manifold member 250 is removably coupled to the second end 392 of the manifold member 252 within the central aperture 396 such that the sealing member 460 of the manifold member 252 contacts an outer surface of the male connecting portion 370 and forms a fluid-tight seal between the manifold members 250, 252.

Figure 24:
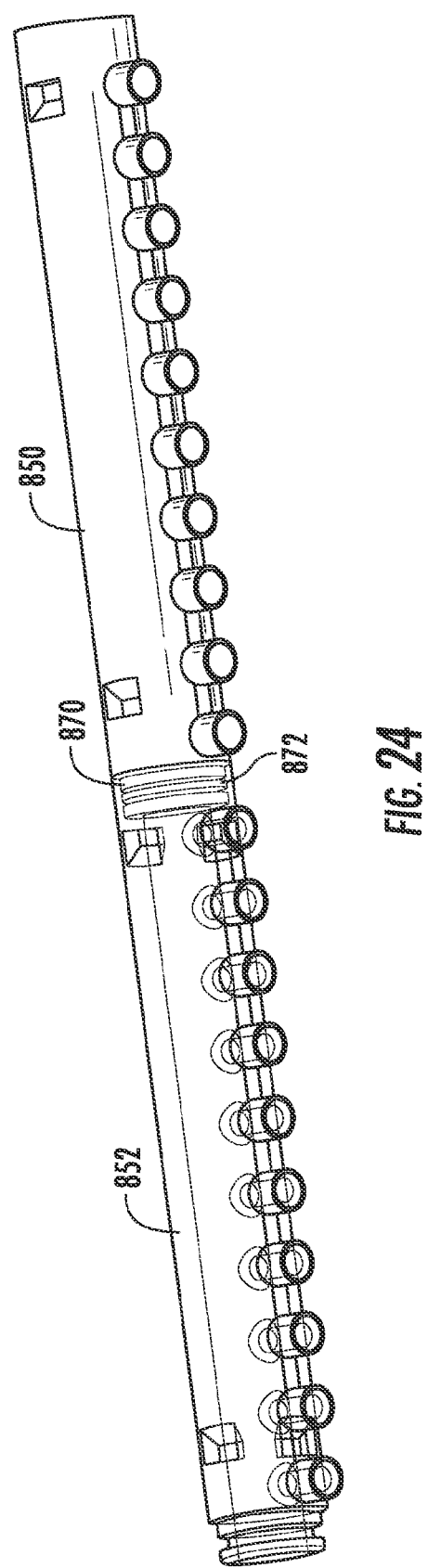
FIG. 24 is a schematic of alternative first and second manifold members that could be utilized in the cooling system of FIG. 1.

Referring to FIG. 24, in an alternative embodiment, the manifold members 850, 852 having an identical structure can replace the manifold members 250, 252, respectively. The primary difference between the manifold member 850 and the manifold member 250 is that the manifold member 850 has a male connecting portion 870 with a circumferential groove therein that holds an o-ring 872 therein. The o-ring 872 contacts an inner surface of the manifold member 852 to form a fluid-tight seal between the manifold members 850, 852.

Referring to FIGS. 1, 2 and 11-13, the connecting assembly 254 is provided to couple to both the manifold member 250 of the manifold assembly 64 and the conduit 70 thus allowing fluid to flow from the conduit 70 through the connecting assembly 254 into the manifold member 250. The connecting assembly 254 includes the connecting fitting 260 and the retaining member 262. In one exemplary embodiment, the connecting fitting 260 and the retaining member 262 are constructed from plastic. Of course, in alternative embodiments, the connecting fitting 260 and the retaining member 262 could be constructed from other materials known to those skilled in the art.

Figure 14:
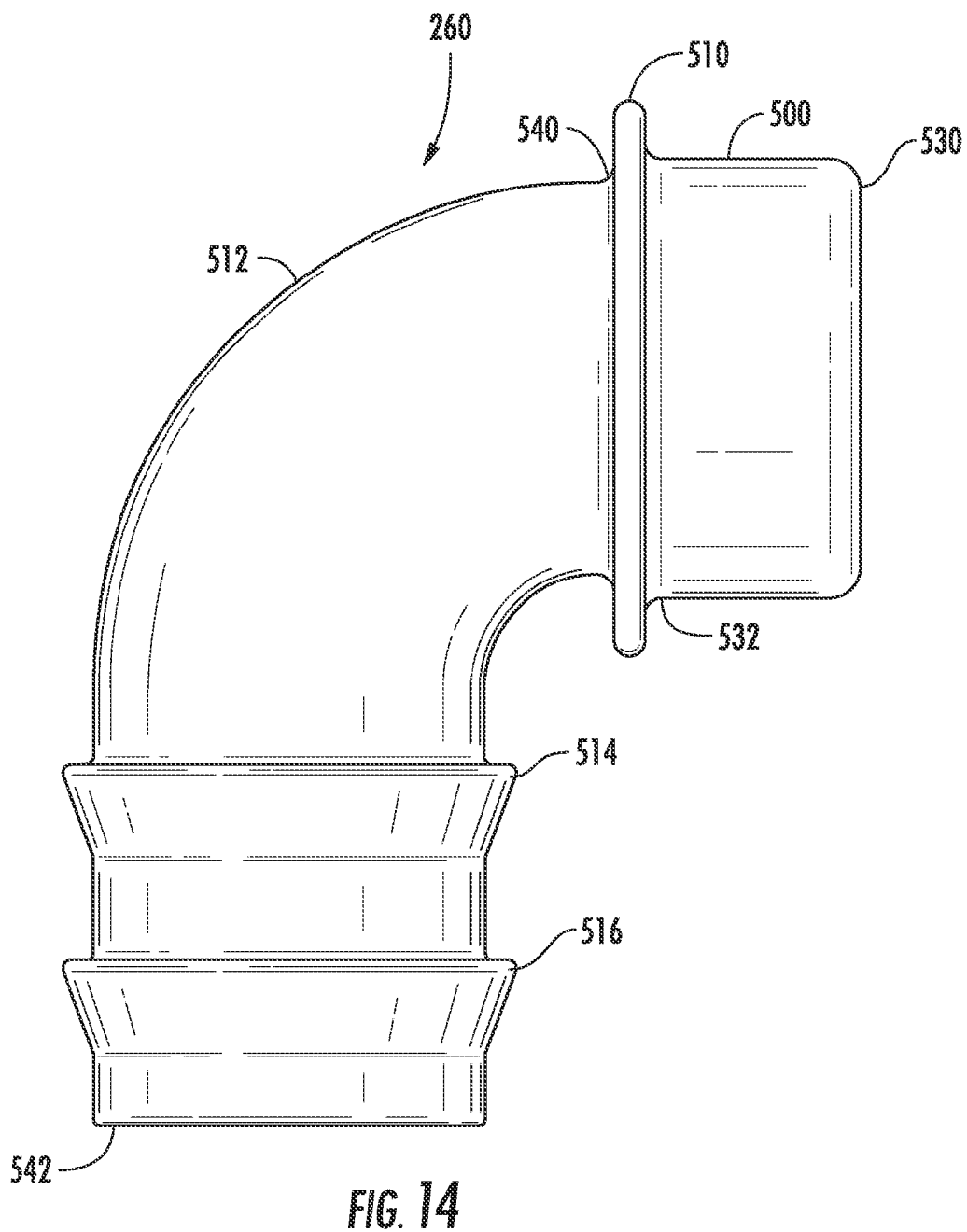
FIG. 14 is a side view of a connecting fitting utilized in the connecting assembly of FIG. 12.
Figure 15:
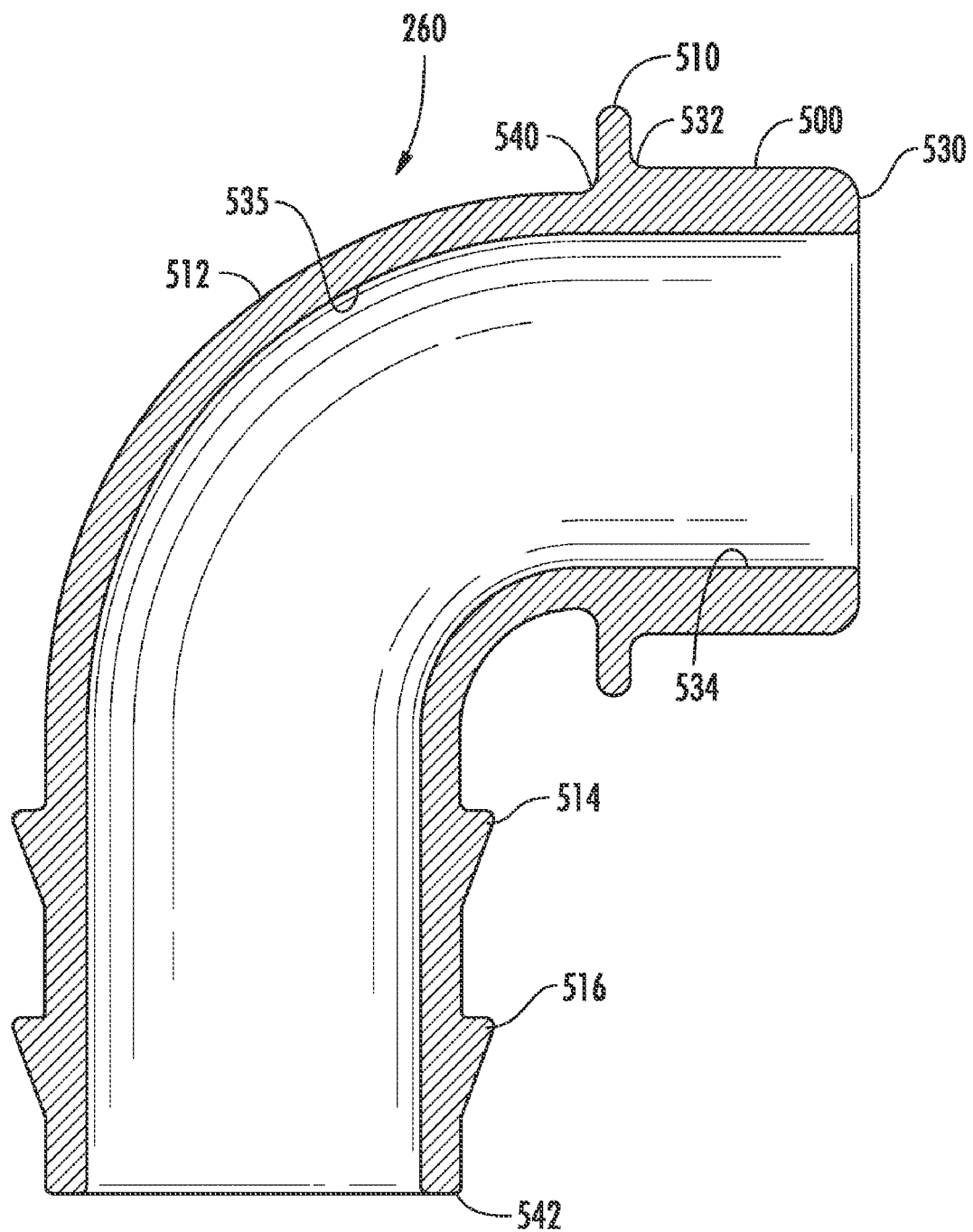
FIG. 15 is a cross-sectional view of a connecting fitting of FIG. 14.
Figure 16:
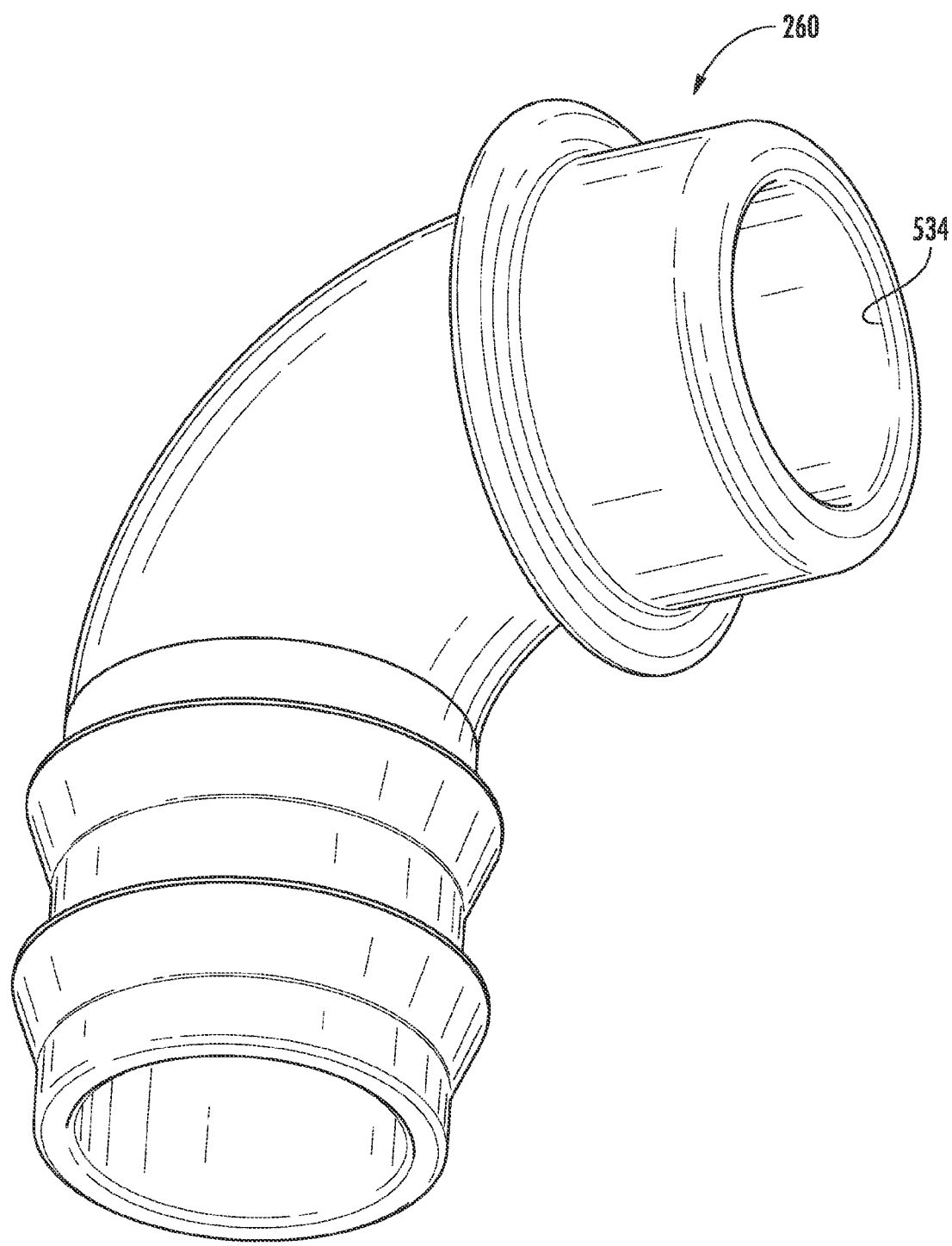
FIG. 16 is another view of the connecting fitting of FIG. 14.
Figure 17:
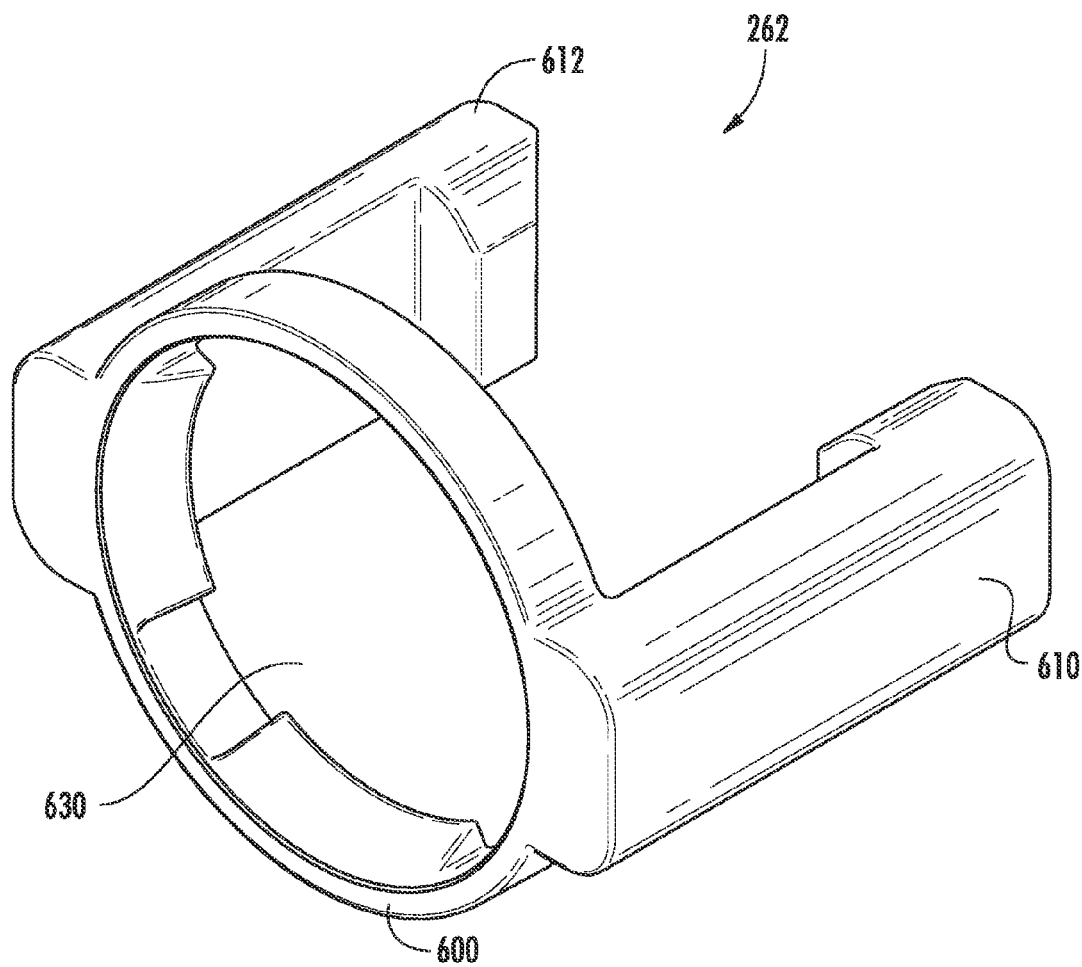
FIG. 17 is a schematic of a retaining member utilized in the connecting assembly of FIG. 11.
Figure 18:
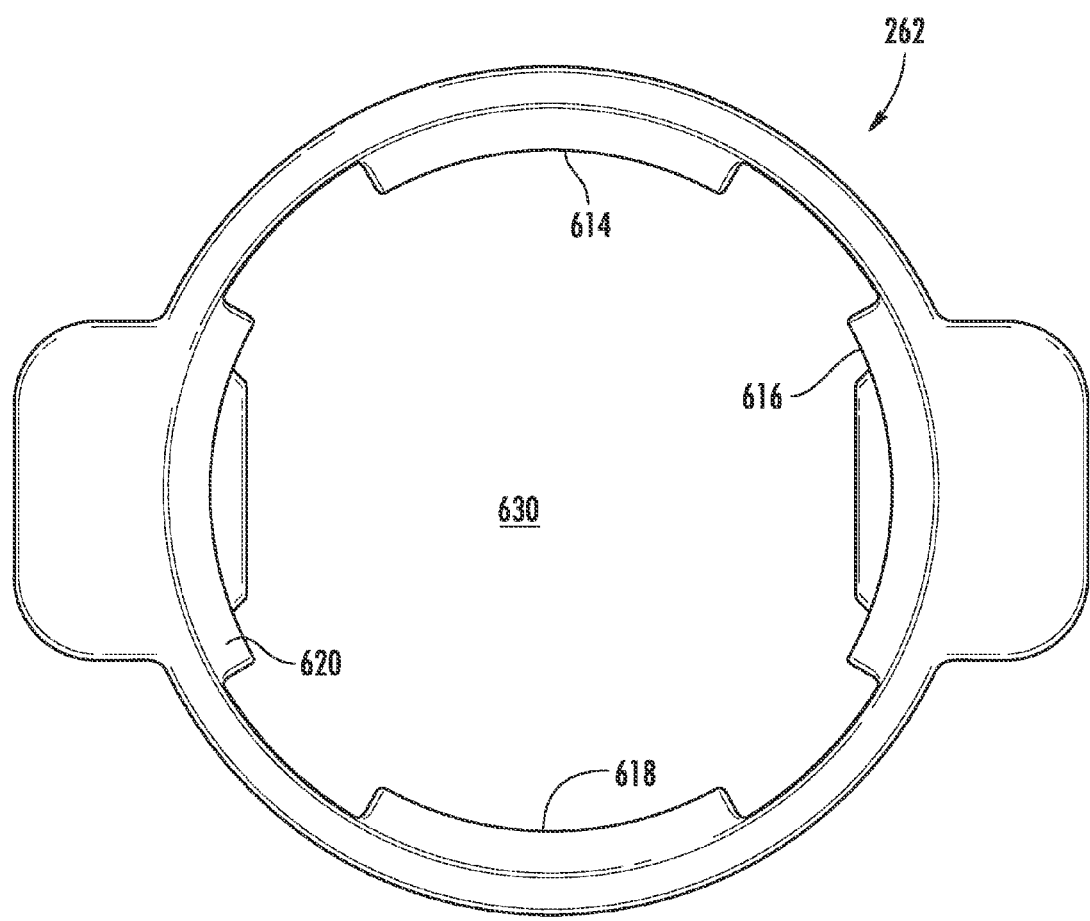
FIG. 18 is a rear view of the retaining member of FIG. 17.
Figure 19:
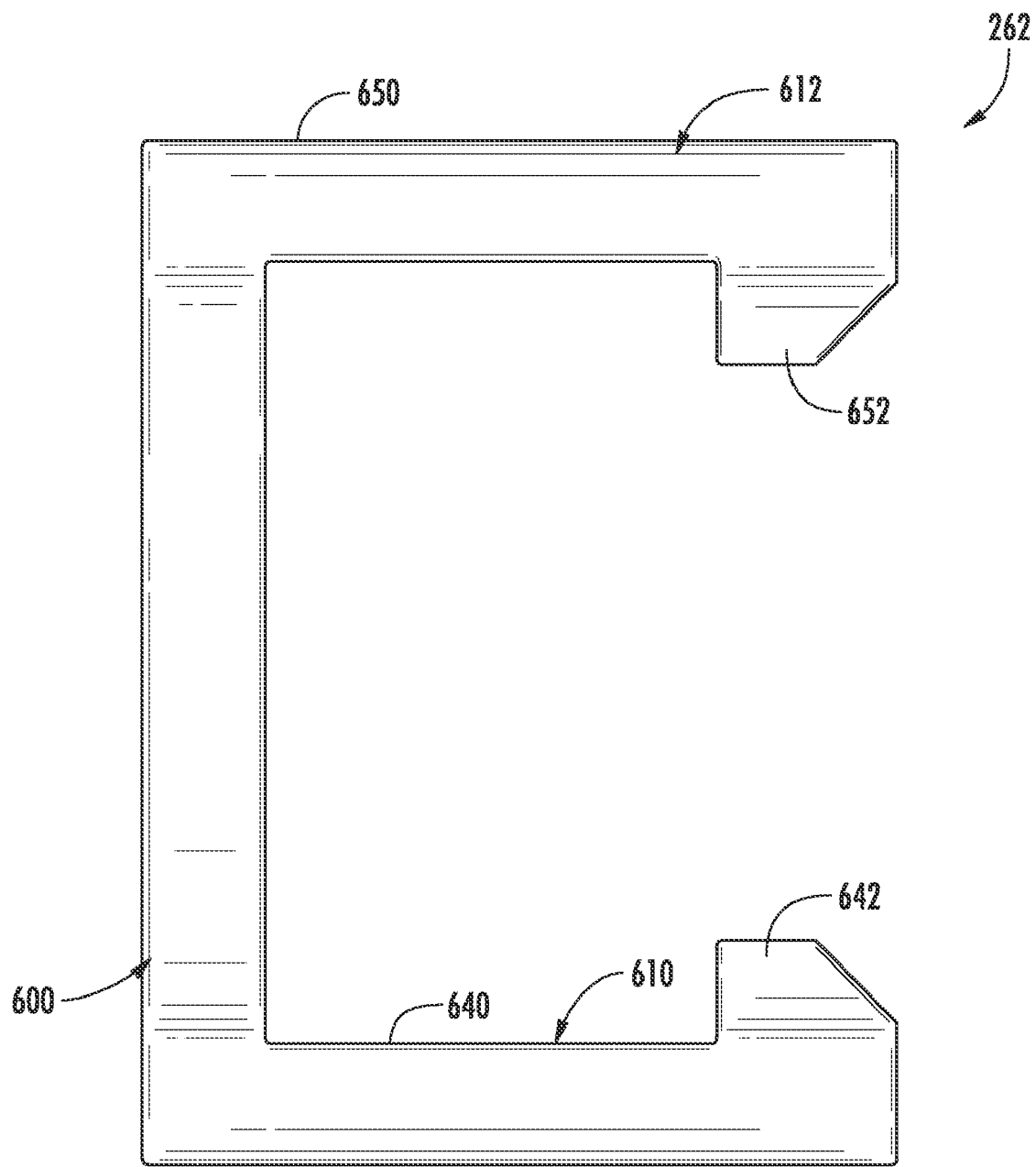
FIG. 19 is a side view of the retaining member of FIG. 17.

Referring to FIGS. 1, 14 and 16, the connecting fitting 260 includes a tubular coupling portion 500, an abutment ring 510, and arcuate-shaped tubular body 512, and ledges 514, 516. The tubular coupling portion 500 includes a first end 530 and a second end 532. The tubular coupling portion 500 further includes a central aperture 534 extending from the first end 530 to the second end 532. The abutment ring 510 is disposed around an outer surface of the tubular coupling portion 500 a predetermined distance from the first end 530 of the portion 500. The arcuate-shaped tubular body 512 has a first end 540 and a second end 542 and a central aperture 535 extending from the first end 540 to the second end 542 that fluidly communicates with the central aperture 534. In one exemplary embodiment, the arcuate-shaped tubular body 512 has a 90° bend therein. An advantage of the 90° bend is that conduits disposed relatively close and substantially parallel to an outer surface of the battery module 30 can be easily coupled to the tubular coupling portion 500 of the connecting fitting 260, which is further coupled to the manifold 250. Of course, in alternative embodiments, the body 512 could have at another angle or no bend therein. The ledges 514, 516 are configured to removably engage an inner surface of the conduit 70 (see FIG. 2) to form a fluid tight seal with the conduit 70. The ledges 514, 516 extend outwardly from an outer surface of the arcuate-shaped tubular body 512 and extend circumferentially around the body 512. Further, the ledge 516 is disposed proximate to the second end 542 of the body 512, and the ledge 514 is disposed between the ledge 516 and the first end 540 of the body 512.

Figure 2:
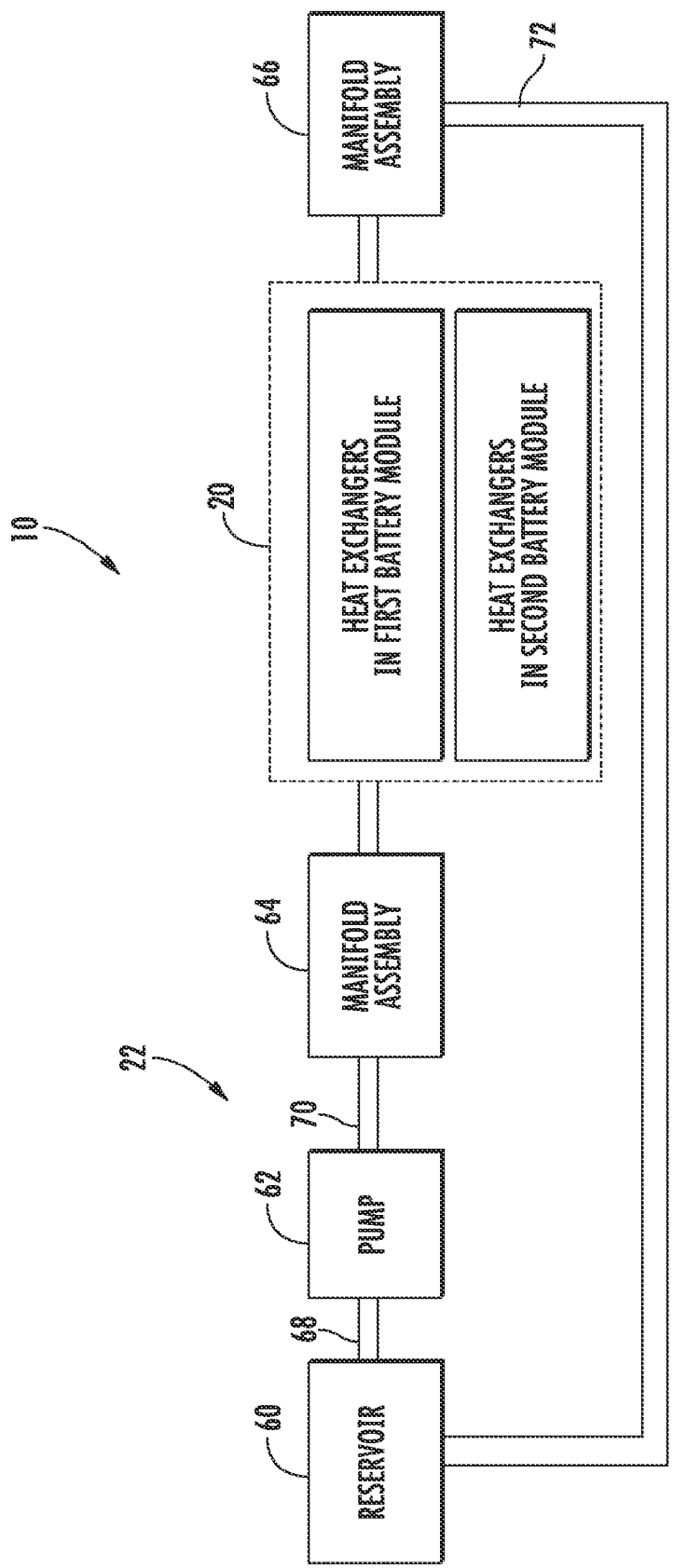
FIG. 2 is a block diagram of the battery system of FIG. 1.
Figure 3:
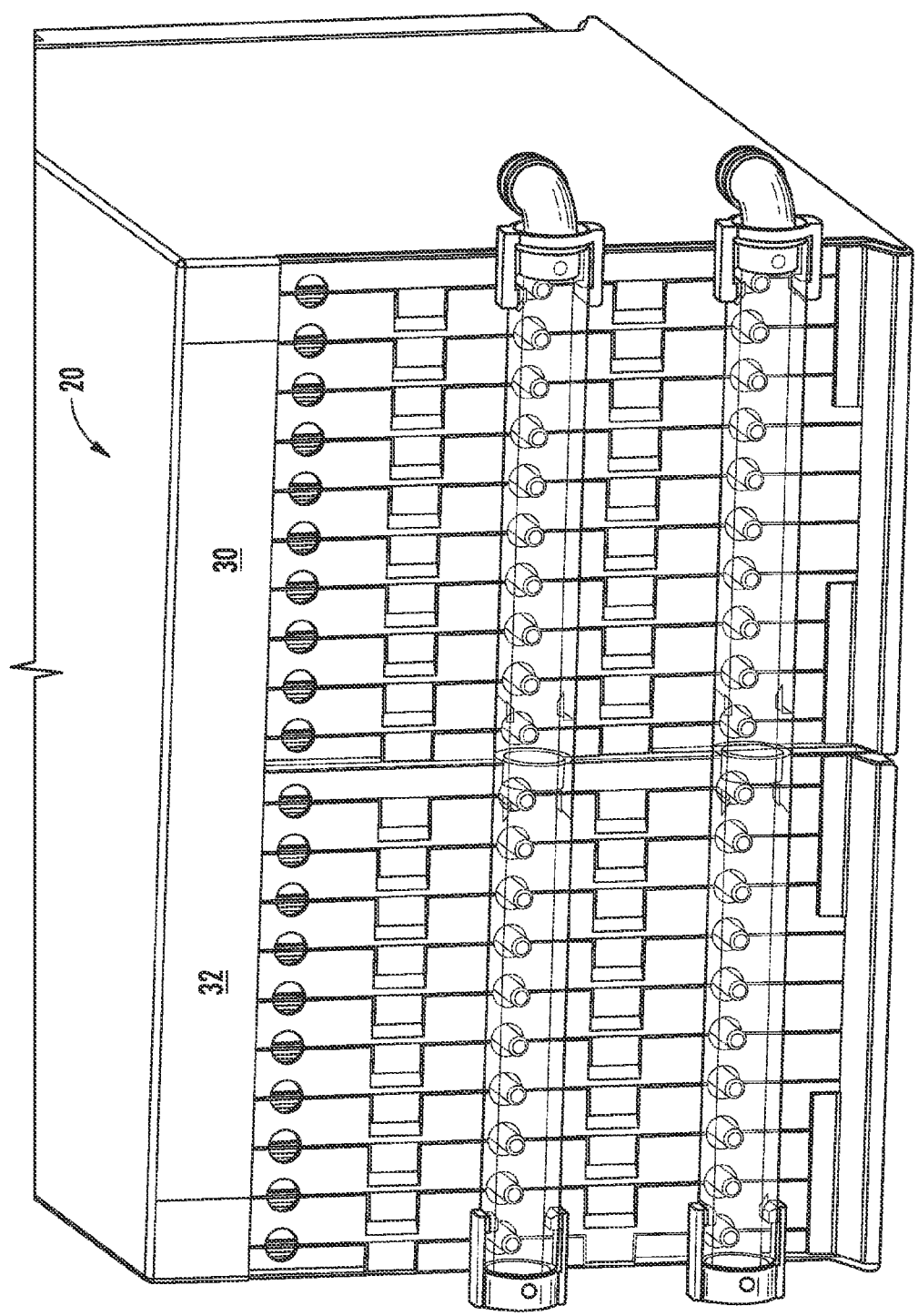
FIG. 3 is an enlarged view of a portion of the battery system of FIG. 1.
Figure 11:
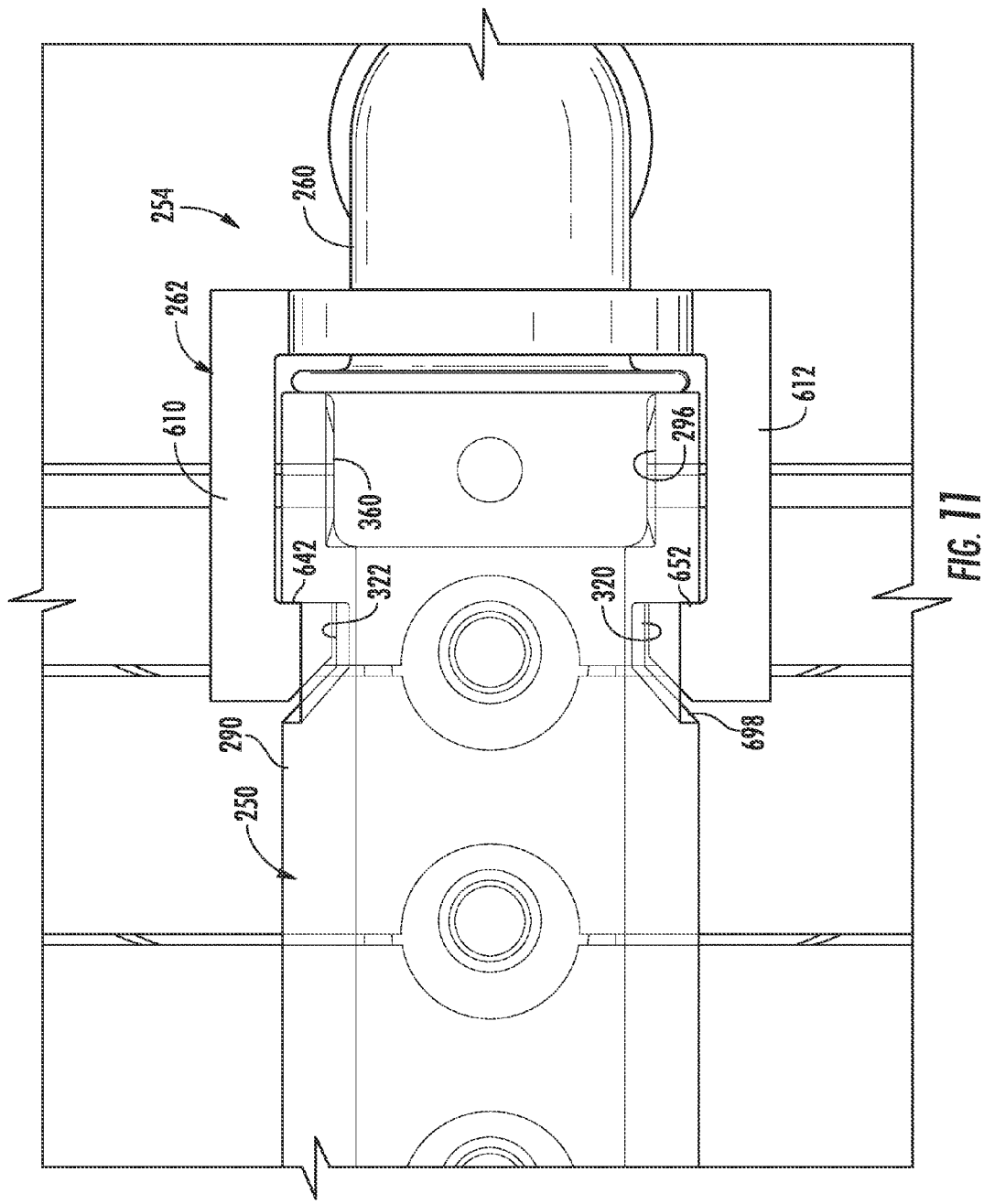
FIG. 11 is a schematic of a portion of a connecting assembly utilized in the battery system of FIG. 1.
Figure 12:
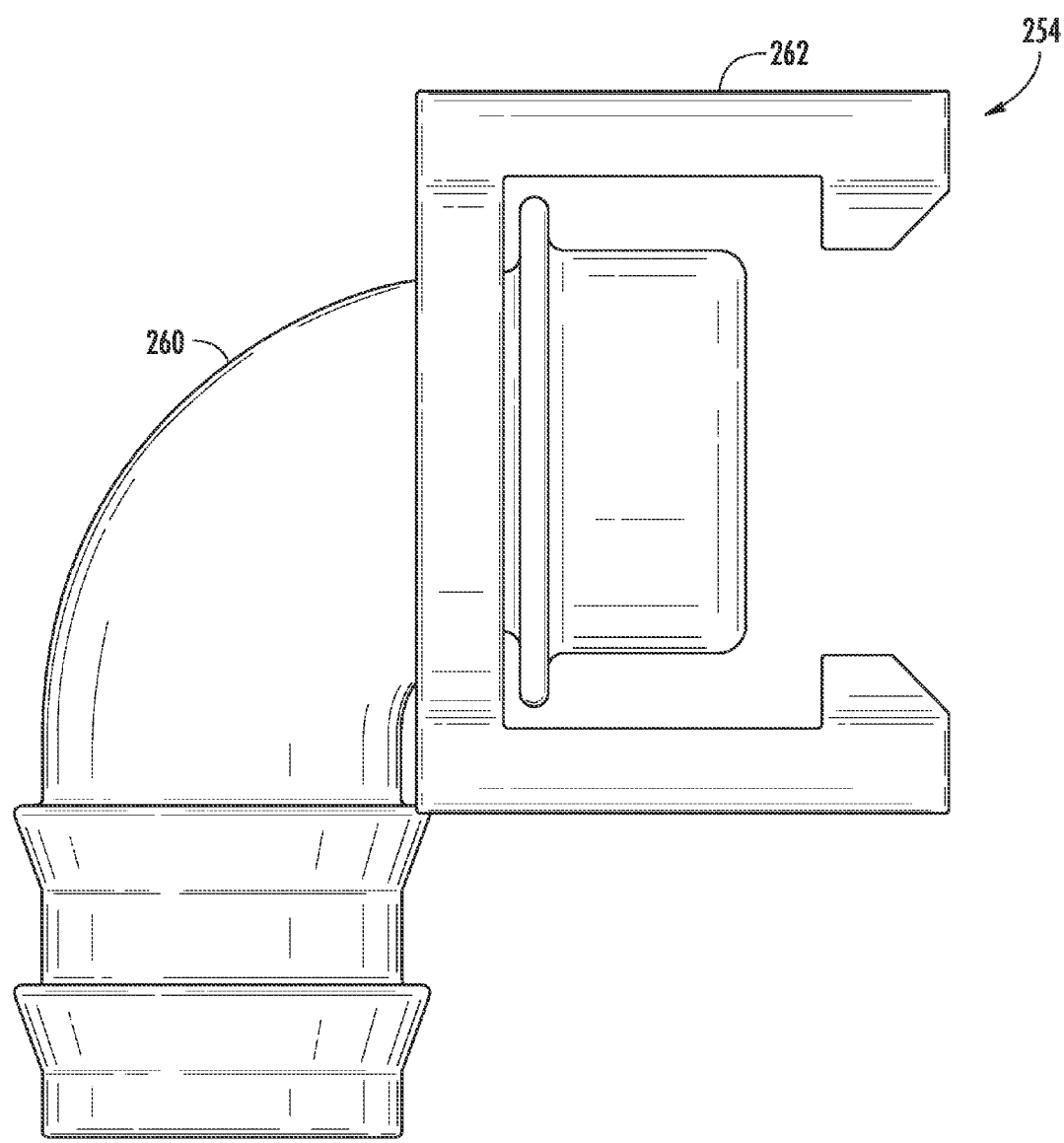
FIG. 12 is a side view of the connecting assembly of FIG. 11 utilized in the battery system of FIG. 1 in accordance with another exemplary embodiment.
Figure 13:
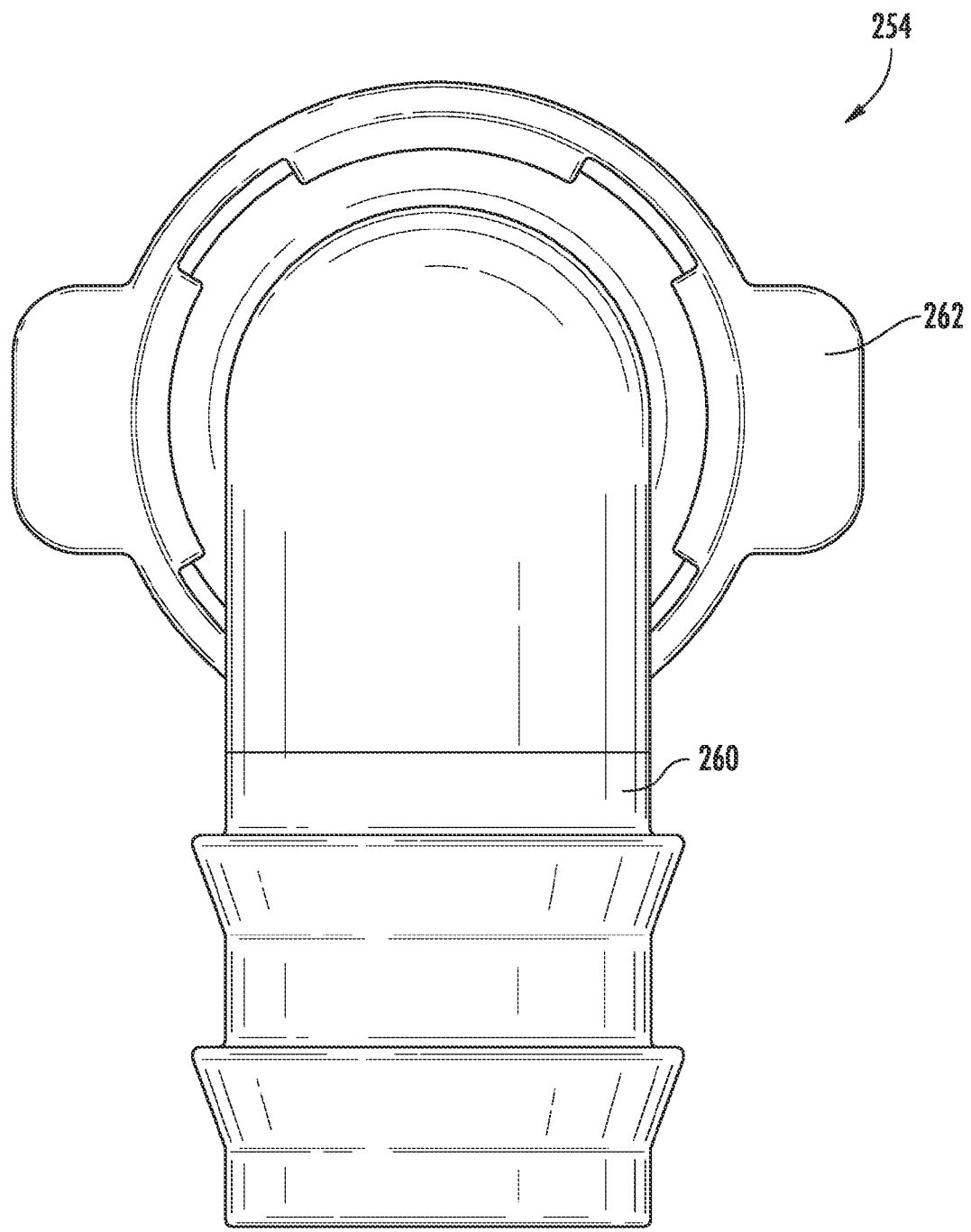
FIG. 13 is a rear view of the connecting assembly of FIG. 12.

Referring to FIGS. 2, 11 and 14, the tubular coupling portion 500 is disposed in the central aperture 296 of the tubular wall 290 of the manifold member 250 and contacts the sealing member 360 to form a fluid-tight seal. An advantage of this configuration is that the connecting fitting 260 can be rotated within the central aperture 296 to a desired angular position for coupling the conduit 70 to the connecting fitting 260.

Referring to FIGS. 1, 11-14 and 17-19, the retaining member 262 is provided to removably couple the connecting fitting 260 on an end of the manifold member 250. The retaining member 262 has a ring-shaped portion 600 and first and second finger portions 610, 612 extending in a first direction from the ring-shaped portion 600. The ring-shaped portion 600 defines a central aperture 630 therein. The retaining member 262 further includes tabs 614, 616, 618, 620 that extend inwardly from the ring-shaped portion 600 into the central aperture 630. The first finger portion 610 has an extension portion 640 and a tab portion 642. The extension portion 640 extends away from the ring-shaped portion 600 in the first direction. The tab portion 642 extends away from the extension portion 640 generally perpendicular to the extension portion 640. The second finger portion 612 has an extension portion 650 and a tab portion 652. The extension portion 650 extends away from the ring-shaped portion 600 in the first direction. The tab portion 652 extends away from the extension portion 650 generally perpendicular to the extension portion 650. The ring-shaped portion 600 is slidably disposed on the tubular body 512 of the connecting fitting 254 such that the tubular body 512 is received through the central aperture 630 and the ring-shaped portion 600 is slidably disposed against the abutment ring 510. A diameter of the central aperture 630 is less than an outer diameter of the abutment ring 500. The first and second finger portions 610, 612 are configured to removably engage notches 322, 320, respectively, in the tubular wall 290 of the manifold member 250 to axially retain the connecting fitting 254 on the manifold member 250. In particular, the tab portions 642, 652 of the finger portions 610, 612 removably engage the notches 322, 320, respectively in the tubular wall 290 of the manifold member 250 to axially retain the connecting fitting 254 on the manifold member 250. In one exemplary embodiment, the retaining member 262 is constructed of plastic. Of course, other materials known to those skilled in the art could be utilized to construct the retaining member 262. An advantage of utilizing finger portions 610, 612 constructed of plastic is that the finger portions 610, 612 can be slightly bent when rotating the finger portions 610, 612 about an outer surface of the tubular wall 290 until the finger portions 610, 612 are seated in the notches 322, 320, respectively.

Figure 23:
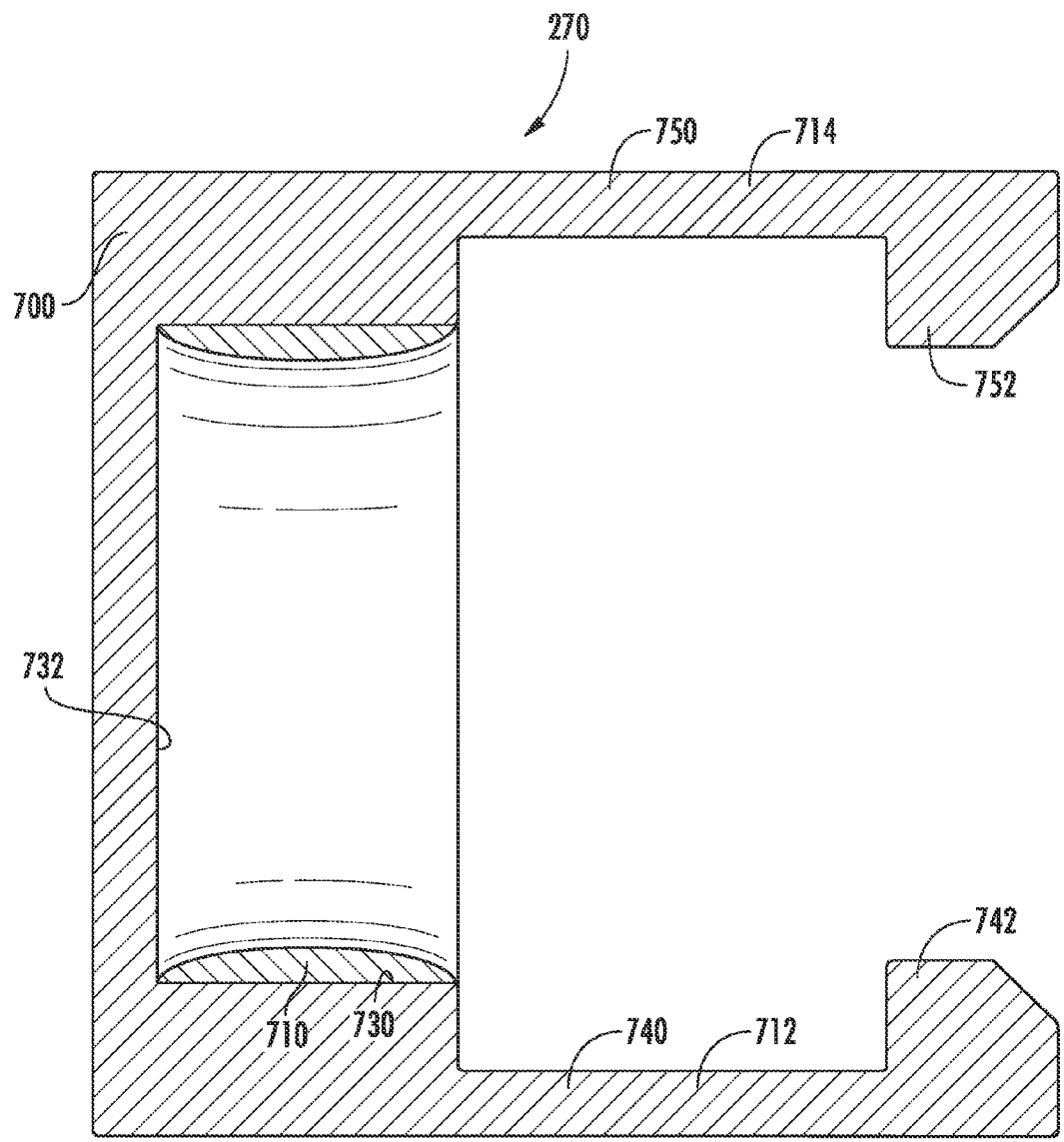
FIG. 23 is another cross-sectional view of the end cap of FIG. 20.

Referring to FIGS. 1 and 20-23, the end cap 270 is configured to be coupled to the male connecting portion 470 and the end 294 of the tubular wall 290 of the manifold member 250 to fluidly seal an opening in the male connecting portion 470. In one exemplary embodiment, the end cap 270 is constructed of plastic. Of course, in alternative embodiments, the end cap 270 could be constructed of other materials known to those skilled in the art. The end cap 270 includes a circular-shaped body 700, a sealing member 710, and the first and second finger portions 712, 714. The circular-shaped body 700 has an inner surface 730 defining an aperture 732 that extends into the circular-shaped body 700 but not completely through the circular-shaped body 700. The sealing member 710 is disposed on at least a portion of the inner surface 730 of the circular-shaped body 700. The first and second finger portions 712, 714 extend in a first direction from the circular-shaped body 700 that are configured to removably engage first and second notches 422, 421 in the tubular wall 390 such that the inner surface 730 contacts an outer surface of the male connecting portion 470 and the end cap 270 is removably attached to the male connecting portion 470 and the tubular wall 390. The first finger portion 712 has an extension portion 740 and a tab portion 742. The extension portion 740 extends away from the circular-shaped body 700 in the first direction. The tab portion 742 extends away from the extension portion 740 generally perpendicular to the extension portion 740. The second finger portion 714 has an extension portion 750 and a tab portion 752. The extension portion 750 extends away from the circular-shaped body 700 in the first direction. The tab portion 752 extends away from the extension portion 750 generally perpendicular to the extension portion 750. Referring to FIG. 23, the first and second finger portions 712, 714 are centered on a plane that bisects the circular-shaped body 700 into two-equal sized regions, one of which is shown in FIG. 23. Also, the sealing member 710 is constructed of an elastomer, such as at least one of styrene, ethylene, butylene, propylene, and diene for example. An advantage of utilizing finger portions 712, 714 constructed of plastic is that the finger portions 712, 714 can be slightly bent when rotating the finger portions 712, 714 about an outer surface of the tubular wall 390 until the finger portions 712, 714 are seated in the notches 422, 421, respectively.

Referring to FIG. 1, during operation as discussed above, the manifold assembly 64 directs fluid into heat exchangers in the battery modules 30, 32 for cooling battery cells in the battery modules 30, 32.

Referring to FIGS. 1 and 2, the manifold assembly 66 is provided to receive fluid from outlet ports in the heat exchangers in the battery modules 30, 32 and to route the fluid to the reservoir 60 via the conduit 72. The manifold assembly 66 includes manifold members 850, 852, a connecting assembly 854 having a connecting fitting 860 and a retaining member 862, and an end cap 870. The manifold members 850, 852 have an identical structure as the manifold members 250, 252, respectively. The manifold members 850, 852 are coupled to outlet ports of the heat exchangers in the battery modules 30, 32, respectively. Also, the end cap 870 has an identical structure as the end cap 270.

The above-described end cap provides a substantial advantage over other devices. In particular, the end cap provides a technical effect of being easily coupled to a tubular wall utilizing first and second finger portions and sealing the end of the tubular wall utilizing an internal sealing member.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed for carrying this invention, but that the invention will include all embodiments falling within the scope of the appended claims. Moreover, the use of the terms, first, second, etc. are used to distinguish one element from another. Further, the use of the terms a, an, etc. do not denote a limitation of quantity, but rather denote the presence of at least one of the referenced items.

I claim:

1. An end cap for sealing an end of a tubular wall, comprising:
    a circular-shaped body having an inner surface and an outer surface, the inner surface defining a cylindrical-shaped aperture that extends into the circular-shaped body but not completely through the circular-shaped body, the inner surface having a first inner surface portion and a second inner surface portion, the first inner surface portion being substantially parallel to an outer end of the circular-shaped body, the second inner surface portion extending from an outer periphery of the first inner surface portion in a first direction and being substantially perpendicular to the first inner surface portion;
    a sealing member disposed on the second inner surface portion of the circular-shaped body; and
    first and second finger portions extending in the first direction from the circular-shaped body, the first finger portion having a first extension portion and a first tab portion, the first extension portion extending away from the circular-shaped body in the first direction, the first tab portion extending away from the first extension portion perpendicular to the first extension portion and toward the tubular wall, the second finger portion having a second extension portion and a second tab portion, the second extension portion extending away from the circular-shaped body in the first direction, the second tab portion extending away from the second extension portion perpendicular to the second extension portion and toward the tubular wall, the first and second tab portions being configured to removably engage first and second notches, respectively, that extend into the tubular wall such that the sealing member contacts an outer surface of the tubular wall and the end cap is removably attached to the tubular wall.

2. The end cap of claim 1, wherein the first and second finger portions are centered on a plane that bisects the circular-shaped body into two-equal sized regions.

3. The end cap of claim 1, wherein the sealing member is constructed of an elastomer.

4. The end cap of claim 3, wherein the elastomer is at least one of styrene, ethylene, butylene, propylene, and diene.

5. The end cap of claim 1, wherein the sealing member has a first surface that is disposed on the second inner surface portion, and an arcuate shaped surface that is configured to contact the outer surface of the tubular wall.

6. The endcap of claim 1, wherein the first tab portion has a chamfered portion that is received within the first notch in the tubular wall.

7. An end cap for sealing an end of a tubular wall, comprising:
    a circular-shaped body having an inner surface and an outer surface, the inner surface defining an aperture that extends into the circular-shaped body but not completely through the circular-shaped body, the inner surface having a first inner surface portion and a second inner surface portion, the first inner surface portion being parallel to an outer end of the circular-shaped body, the second inner surface portion extending from an outer periphery of the first inner surface portion in a first direction and being perpendicular to the first inner surface portion;
    a sealing member having a first surface that is disposed on the second inner surface portion of the circular-shaped body, and an arcuate shaped surface that is configured to seal against an outer surface of the tubular wall; and
    first and second finger portions extending in the first direction from the circular-shaped body, the first finger portion having a first extension portion and a first tab portion, the first extension portion extending away from the circular-shaped body in the first direction, the first tab portion extending away from the first extension portion perpendicular to the first extension portion and toward the tubular wall, the second finger portion having a second extension portion and a second tab portion, the second extension portion extending away from the circular-shaped body in the first direction, the second tab portion extending away from the second extension portion perpendicular to the second extension portion and toward the tubular wall, the first and second tab portions being configured to removably engage first and second notches, respectively, that extend into the tubular wall such that the arcuate shaped surface of the sealing member contacts the outer surface of the tubular wall and the end cap is removably attached to the tubular wall.

8. The end cap of claim 7, wherein the sealing member is constructed of an elastomer.

9. The endcap of claim 8, wherein the first tab portion has a chamfered portion that is received within the first notch in the tubular wall.

* * * * *